United States Patent [19]

Williams et al.

[11] Patent Number: 5,110,784
[45] Date of Patent: May 5, 1992

[54] DUAL SURFACE POROUS MATERIAL

[75] Inventors: Dwight E. Williams; Thomas J. Tangney, both of Midland County; Anthony Revis, Saginaw County, all of Mich.

[73] Assignee: Dow Corning Corporation, Midland, Mich.

[21] Appl. No.: 479,133

[22] Filed: Feb. 12, 1990

Related U.S. Application Data

[63] Continuation-in-part of Ser. No. 154,754, Feb. 11, 1988, abandoned, which is a continuation-in-part of Ser. No. 901,349, Aug. 28, 1986, abandoned, which is a continuation of Ser. No. 736,030, May 20, 1985, abandoned, which is a continuation of Ser. No. 598,091, Apr. 9, 1984, abandoned.

[51] Int. Cl.$^5$ ............... B01J 20/32; B01J 20/22; B01D 15/08; B32B 5/14

[52] U.S. Cl. ............... 502/401; 55/386; 210/198.2; 210/198.3; 210/656; 252/184; 427/387; 428/405; 428/447; 502/402

[58] Field of Search ............... 502/401–404, 502/5, 150, 158, 159; 55/386; 210/198.2, 198.3, 656; 252/184; 427/54.1, 387; 428/405

[56] References Cited

U.S. PATENT DOCUMENTS

| | | | |
|---|---|---|---|
| 3,207,699 | 9/1965 | Harding et al. | 502/158 |
| 3,839,385 | 10/1974 | Meiller et al. | 502/401 |
| 3,984,349 | 10/1976 | Meiller et al. | 502/401 |
| 4,061,503 | 12/1977 | Berger et al. | 106/308 Q |
| 4,062,693 | 12/1977 | Berger | 106/308 Q |
| 4,105,465 | 8/1977 | Berger | 106/308 Q |
| 4,233,366 | 11/1980 | Samre, Jr. et al. | 106/308 Q |
| 4,298,500 | 11/1981 | Abbott | 502/7 |
| 4,324,689 | 4/1982 | Shah | 502/401 |
| 4,379,931 | 4/1983 | Plueddemann | 502/150 |
| 4,512,898 | 4/1985 | Oi et al. | 55/386 |
| 4,540,486 | 9/1985 | Ramsden | 502/407 |
| 4,604,207 | 8/1986 | Oi et al. | 252/184 |
| 4,773,994 | 9/1988 | Williams | 502/401 |
| 4,778,600 | 10/1988 | Williams | 502/401 |
| 4,782,040 | 11/1988 | Revis et al. | 502/401 |

OTHER PUBLICATIONS

Poole, C. F.—Recent Advances in Silylation of Organic Compounds for Gas Chromotography—Chap. 4, K. Blan & C. King-Heyden, London, 1977—pp. 152–200.
J. Phys. Chem.—Hertz et al.—vol. 75—No. 14—1971.
J. of Coll. & Int. Sci.—Chmieloewiec et al.—vol. 94, No. 2, Aug. 1983.
Advances in Coll. & Int. Sci.—Boksanyi et al.—6—(1976)—pp. 95–137.
Intro. to Mod. Liq. Chrom.—Snyder et al.—2 Ed.—Wiley Interscience, N.Y., 1979.

Primary Examiner—Paul E. Konopka
Attorney, Agent, or Firm—Robert L. McKellar

[57] ABSTRACT

Porous materials having a dual surface are disclosed. Also disclosed is a method for their preparation. An example of such a material is silica gel reacted with 1,1,1-trifluoropropyldimethylsilyl-N-methylacetamide and then, with N-trimethylsilyl-N-methylacetamide to give a dual treated material having 1,1,1-trifluoropropyldimethylsilyl groups on the exterior surface and trimethylsilyl groups on the porous interior surface.

90 Claims, 2 Drawing Sheets

Dual Surface Material

POROUS PARTICLE CROSS-SECTION

LEGEND
● FIRST RESIDUE
○ SECOND RESIDUE
| UNREACTED HYDROXYL

Figure 1: Dual Surface Material
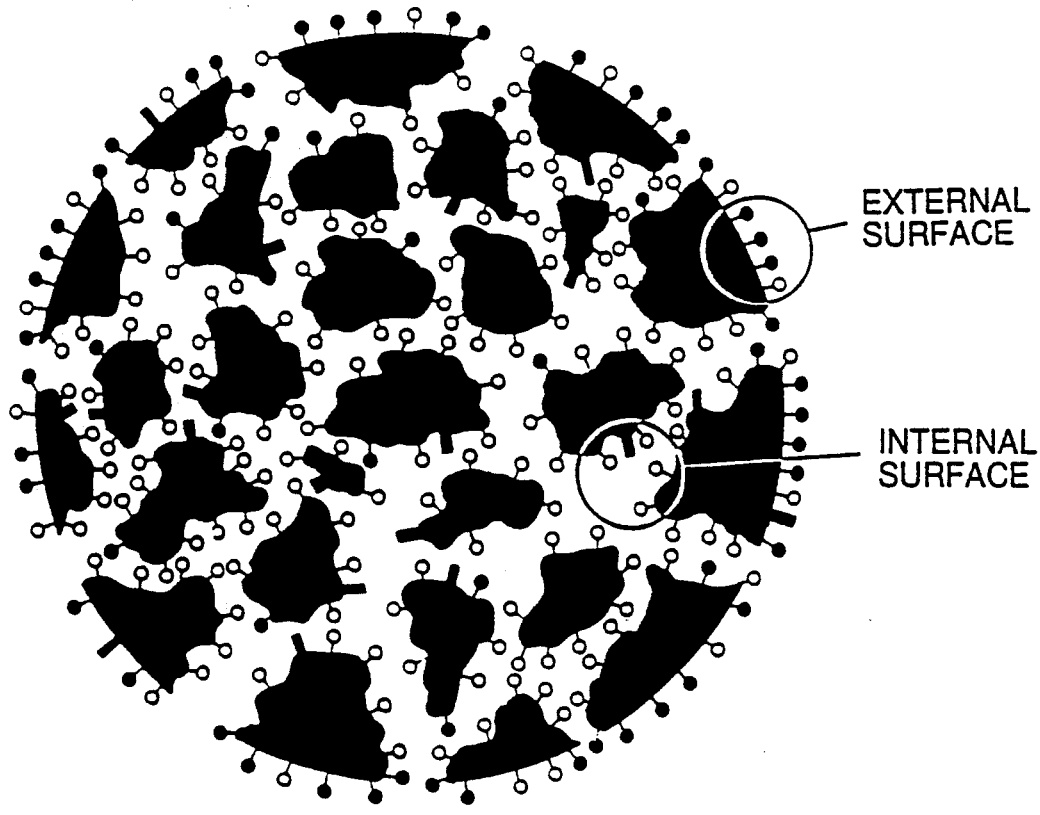
POROUS PARTICLE CROSS-SECTION
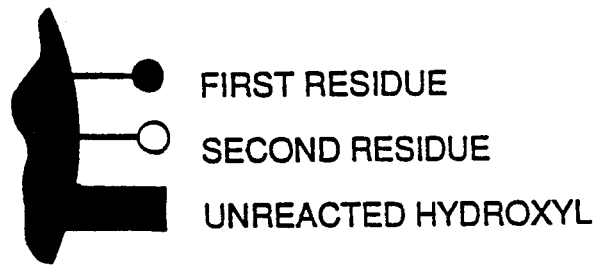
LEGEND
● FIRST RESIDUE
○ SECOND RESIDUE
UNREACTED HYDROXYL

Figure 2: Mixed Phase Composition
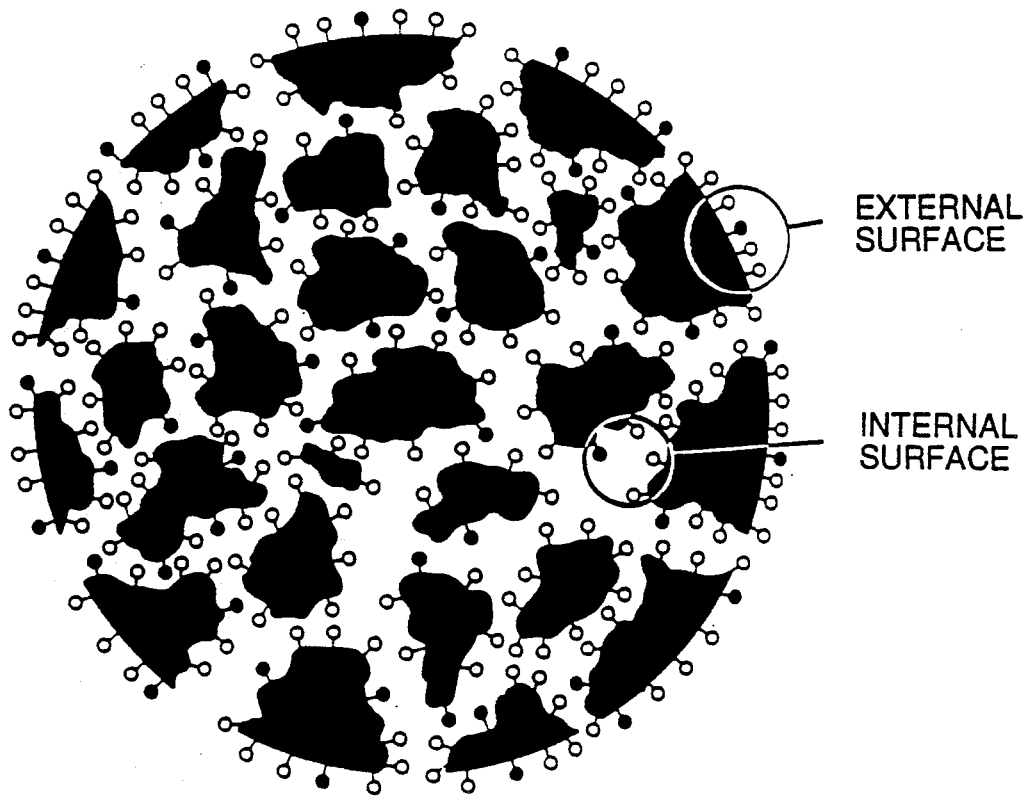
POROUS PARTICLE CROSS-SECTION
LEGEND
FIRST RESIDUE
SECOND RESIDUE

DUAL SURFACE POROUS MATERIAL

This is a continuation in part of application Ser. No. 154,754, filed Feb. 11, 1988, now abandoned, which is a continuation in part of application Ser. No. 901,349, filed Aug. 28, 1986, now abandoned, which is a continuation of application Ser. No. 736,030 filed May 20, 1985, now abandoned, which is a continuation of Ser. No. 598,091, filed Apr. 9, 1984, now abandoned.

BACKGROUND OF THE INVENTION

According to Plueddemann, in the chapter on silylating agents in "Encyclopedia of Chemical Technology", 3rd edition, volume 20, page 962 et seq., silylation is the displacement of active hydrogen from an organic molecule by a silyl group. Plueddemann further states that "The active hydrogen is usually OH, NH, or SH, and the silylating agent is usually a trimethylsilyl halide or a nitrogen-functional compound. A mixture of silylating agents may be used; a mixture of trimethylchlorosilane and hexamethyldisilazane is more reactive than either reagent alone, and the by-products combine to form neutral ammonium chloride."

Thus, what Plueddemann has described is what those skilled in the art regard as the "normal way" to silylate organic molecules using reactive silanes.

It has been beneficial to industry to have this approach available to alter organic molecules to achieve certain new molecules. See, for example, Poole, C. F., Recent Advances in Silylation of Organic Compounds for Gas Chromatography, Chapter 4, "Handbook of Derivatives for Chromatography", K. Blau and G. King, Heyden, London, 1977, p. 152-200. Those skilled in the art have extrapolated silylation of organic molecules to silylation of inorganic molecules and materials as well. For example, it is known that silicas, used as fillers for compounded rubbers, could be treated with reactive silanes such as trimethylchlorosilane and/or hexamethyldisilazane to place trimethylsilyl groups on the surface of such silicas. This treatment arises through the reaction of the hydroxyls on the silica with the reactive silanes. See, for example, Hertl, W. and Hair, M. L., "Reaction of Hexamethyldisilazane with Silica", J. of Phys. Chem., Volume 75, No. 14, 1971 and Chmieloweic, J. and Marrow, B. A., "Alkylation of Silica Surfaces", J. of Coll. and Inter. Sci., Volume 94, No. 2, August 1983 and Boksanyi, L., Liardon, O. and Kovats, E., Advances in Coll. and Inter. Sci., 6 (1976), p. 95-137.

Porous support materials used in liquid or thin layer chromatography applications also benefit by silylation techniques. Such materials have a very large surface area within their porous interior, so that the exterior surface accounts for less than one percent of the total surface area. Such materials can be in either particulate or non-particulate forms (e.g., coatings). It is common in this art to use reactive silanes to treat such materials to remove accessible reactive hydroxyl groups on the entire surface including that of the porous interior to improve the chromatographic properties of polar molecules. See, for example, L. R. Snyder and J. J. Kirkland, Introduction to Modern Liquid Chromatography, 2nd edition, Wiley-Interscience, N.Y. 1979.

A more significant advance in the silylation art came about by the use of reactive silanes which also contained organofunctional groups to silylate surfaces. The desired result was to create a material having a novel end-use which was dependent on the type of organofunctional group included in the silylating silane. For example, in U.S. Pat. No. 4,379,931, issued on Apr. 12, 1983, Plueddemann used unique reactive silanes, for example

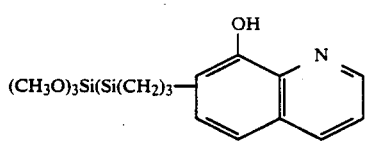

to treat various particulate materials which were then used to extract metal ions from solution.

For most of the practical applications known in the prior art, the preferred mode of silylation is that which is carried out in solution. There are, however, some silylation applications wherein the silylation reaction is carried out from the vapor phase. It can be concluded therefore that it is generally known in the art to use various reactive silanes to react with hydroxyls on the surfaces of various materials.

Brief Description of the Drawings

FIG. 1 is an artist's illustration of a cross section of a dual surface material of the instant invention.

FIG. 2 is an artist's illustration of a cross section of a mixed phase composition of the type described in U.S. Pat. No. 4,298,500.

THE INVENTION

What is disclosed in this invention is the use of stable but rapidly reacting silanes to react with the hydroxyls on the exterior surfaces of porous materials, and then the use of a second reactive silane to react with the hydroxyls on the porous interior surface of the porous material to provide a dual surface material in the sense that the silicon-containing groups attached to the exterior surface are different than the silicon-containing groups on the surface of the porous interior of the material.

Further, it is contemplated that the silicon-containing groups covalently bonded to the exterior surface of the porous material will be predominantly those obtained from the rapidly reacting silane while the silicon-containing groups covalently bonded to the interior surface of the porous material will be predominantly those obtained from the second reactive silane.

It is believed by the inventors herein that such dual surface materials are unique, having never been disclosed anywhere in the published literature. Such dual surface materials may be prepared by selecting dual groups that independently adjust transport properties to, and chemical activities of, the dual surface materials.

Thus, it is an object of this invention to provide a method for preparing a composition having a dual surface, the method comprising (I) contacting a hydroxyl-bearing porous material with less than a stoichiometric equivalent, based on the hydroxyl content of the porous material, of a rapidly reacting silane; (II) allowing the mixture from (I) to react and form covalent bonds by reaction with the exterior surface hydroxyl groups thereby treating the porous material exterior surface; (III) thereafter, contacting and mixing the treated porous material from (II) with a reactive silane, different than the silane of steps (I) and (II), for a period of time to allow the reactive silane, or its silanol-bearing hydrolysis product, to diffuse into the interior of the porous material and covalently bond by reaction with hydroxyl groups on the interior surface of the porous material; and (IV) subsequently isolating the dual surface porous material from the mixture of (III).

It is a further object of this invention to provide a composition of matter consisting of a porous material having covalently bonded to its exterior surface, immobilized silicon-containing groups and having covalently bonded to the surface of its porous interior, silicon-containing groups which are different from those bonded to the exterior surface.

Thus, the ultimate goal of this invention is to provide a method which will give a composition that has a dual surface. What is meant by "dual surface" for purposes of this invention is that the silicon-containing groups covalently bonded by a siloxy bond to the exterior surface of the porous material are different in nature than the silicon-containing groups covalently bonded by siloxy bonds to the porous interior surface of the porous materials.

This goal can be achieved by first reacting the porous material with a small amount of a stable, rapidly reacting silane to treat the exterior surface of the porous material with little or no diffusion of the silane in its rapidly reacting form into the pores and therefore, little or no treatment within the pores by the rapidly reacting silane, and then, reacting the so-treated porous material with an excess of a second reactive silane different from the first silane, and allowing the reactive silane, or its silanol-bearing hydrolysis product, to diffuse into the pores and covalently bond to the interior surface.

This invention differs from another approach, in that, in a co-pending application entitled "Porous Materials Having a Dual Surface", having the Ser. No. 598,120, filed Apr. 9, 1984, now U.S. Pat. No. 4,782,040, issued Nov. 1, 1988, the inventors prepared dual surface porous materials by using an unstable, highly reactive silane intermediate in the first step of the method as opposed to the use of a stable, rapidly reacting silane used in the first step of this inventive method.

There is one major factor that allows the inventive method to produce the inventive compositions herein. The rapidly reacting silanes are chosen so that they react very rapidly with the exterior surface hydroxyls of the porous materials, and therefore, their physical entry into the pores is severely limited while the exterior hydroxyls are being treated.

In this inventive method then, the first phase of the process requires two steps. The first step, i.e. step (I), requires contacting a porous material with a rapidly reacting silane, and step (II) requires allowing the rapidly reacting silane to react with the porous material to obtain a "treated" porous material. Step (III) is then carried out by contacting the "treated" porous material with a second reactive silane, or its silanol-bearing hydrolysis product, and allowing the reactive silane, or its hydrolysis product, to diffuse into the pores and react with the hydroxyls therein. Subsequently, the desired end-product is isolated from the reaction mixture by some means.

For purposes of this invention, in steps (I) and (II), the rapidly reacting silanes are selected from those that are known in the art to react very rapidly with hydroxyl groups. Such silanes are those whose rate of reaction, with surface hydroxyls of hydroxylated porous materials, is fast enough that the silanes do not have time to significantly diffuse into the porous interior of the porous material. Thus, factors which influence the selection of the silanes that are useful in the first steps of the inventive method are the leaving groups, which should be selected from those which generally display a rapid rate of reaction with hydroxyl groups: the type of substitution on the silane such that the leaving groups on the silane are compatible, i.e. non-reactive, with any organofunctional group on the silane molecule so that the highly reactive silane is stable in the absence of hydroxyl groups; the properties that one desires from the permanent groups that are left on the silane molecule after covalent attachment to the exterior surface; and the combination of groups substituted on silicon such that steric hindrance will not too severely slow the rate of reaction with the exterior hydroxyl groups.

It is well known that prolonged reaction of excess amounts of reactive silane under anhydrous conditions results in reaction of only 25% to 50% of the active sites on the porous material since further reaction is inhibited by steric hindrance between the immobilized residues. For the purposes of this invention, such sterically available sites will be designated the "saturation coverage". It is also well known that such "saturation coverage" depends upon the steric requirements of a particular residue.

Note that this designation of "saturation coverage" is applicable to reactive silanes with one or more leaving groups. Under anhydrous conditions, such silanes cannot lead to condensed products in which multiple layers of undefined saturation could form.

The rapidly reacting silanes useful in the first step of this invention are those silanes selected from a group consisting of
(i) disubstituted amides wherein the amides are selected from a group consisting of
(a) N,N-disubstituted amides having the general formula

and
(b) N,O-disubstituted amides having the general formula

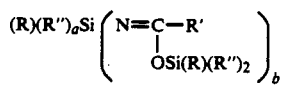

wherein in said formulae, R is selected from hydrogen, allyl, vinyl and Q wherein Q is selected from a group consisting of
(a) alkyl groups having less than twenty carbon atoms,
(b) aryl groups having less than twenty carbon atoms,
(c) —$(CH_2)_2CF_3$,
(d) —$(CH_2)_3Cl$,
(e) —$(CH_2)_3SR^{iv}$,
(f) —$(CH_2)_3NR_2^{iv}$,
(g) —$(CH_2)_3N(R^{iv})(CH_2)_2N(R^{iv})_2$,
(h)

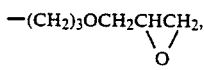

(i)

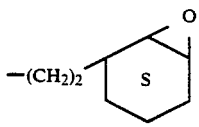

(j) —(CH$_2$)$_3$OC(O)C(CH$_3$)=CH$_2$ and
(k)

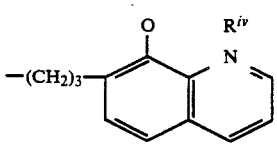

wherein R'' is independently selected from methyl, ethyl and phenyl groups; R''' is selected from methyl, ethyl and phenyl groups; R' is a substituted or unsubstituted alkyl group of from 1 to 6 carbon atoms or hydrogen; R$^{iv}$ is selected from methyl, ethyl and phenyl groups; a+b has a value of 3 and neither a nor b has a value of zero;

(ii) substituted amines wherein the amines are selected from a group consisting of
 (a) N,N,N-trisubstituted amines having the general formula (R$^v$)(R$^{vi}$)$_c$Si(NR$^{vii}$$_2$)$_d$ and
 (b) heterocyclic amines, wherein the heterocyclic amines are selected from the group consisting of

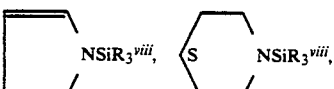

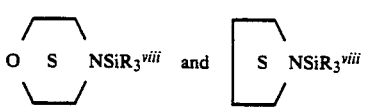

wherein in said formulae R$^v$ and R$^{viii}$ are each independently selected from a group consisting of hydrogen, allyl, vinyl and Q' wherein Q' is selected from a group consisting of
 (a) alkyl groups having less than twenty carbon atoms,
 (b) aryl groups having less than twenty carbon atoms,
 (c) —(CH$_2$)$_2$CF$_3$,
 (d) —(CH$_2$)$_3$SR$^{ix}$,
 (e) —(CH$_2$)$_3$NR$_2$$^{ix}$,
 (f) —(CH$_2$)$_3$N(R$^{ix}$)(CH$_2$)$_2$NR$^{ix}$)$_2$,
 (g)

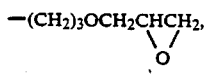

(h)

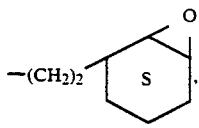

(i) —(CH$_2$)$_3$OC(O)C(CH$_3$)=CH$_2$ and
(j)

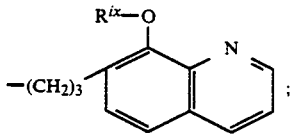

wherein R$^{vi}$ is independently selected from methyl, ethyl and phenyl groups; R$^{vii}$ is independently selected from methyl, ethyl and phenyl groups; R$^{ix}$ is independently selected from alkyl groups of 1 to 6 carbon atoms and phenyl groups; c+d has a value of 3 and neither c nor d has a value of zero;

(iii) thioethers selected from the group consisting of
 (a) thioethers having the general formula R$^x$R$_2$$^{xi}$Si(SR$^{xii}$)$_d$ and (b) thioethers having the general formula (R$^x$R$_2$$^{xi}$Si)$_2$S wherein in said formulae, R$^x$ is selected from a group consisting of hydrogen, allyl, vinyl and Q'' wherein Q'' is selected from a group consisting of
 (a) alkyl groups having less than twenty carbon atoms,
 (b) aryl groups having less than twenty carbon atoms,
 (c) —(CH$_2$)$_2$CF$_3$,
 (d) —(CH$_2$)$_3$SR$^{xiii}$,
 (e) —(CH$_2$)$_3$NR$_2$$^{xiii}$,
 (f) —(CH$_2$)$_3$N(R$^{xiii}$)(CH$_2$)$_2$N(R$^{xiii}$)$_2$,
 (g)

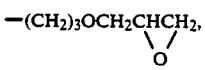

(h)

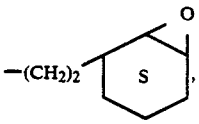

(i) —(CH$_2$)$_3$OC(O)C(CH$_3$)=CH$_2$ and
(j)

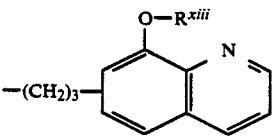

wherein R$^{xi}$ is independently selected from methyl, ethyl and phenyl groups; R$^{xii}$ and R$^{xiii}$ are each independently selected from alkyl groups having 1 to 6 carbon atoms and phenyl.

The porous materials found useful in this invention are those materials which are porous solids having hydroxyl groups on their surfaces. Such materials for example are silica, silica gel, alumina, stannia, titania, zirconia, and the like. Also, these materials can be porous glass, porous ceramic or plastic as long as the material has, or will form, hydroxyl groups on its surface.

The form of the porous material is not overly critical. Particulate porous materials, as well as filaments, slabs, discs, blocks, spheres, films and other such forms can be used in this invention. Also contemplated within the scope of this invention is the treatment of particulate materials by the process of this invention, and the subsequent forming of the treated particulate materials into slabs, discs, blocks, spheres, films, membranes, sheets, and the like.

Preferred for this invention are the porous metalloid and metallic oxides such as silica, alumina, stannia and titania in all of their related forms. Most preferred are the silicas. Also contemplated within the scope of this invention are porous mixed metallic oxides such as Na2O; Al2O3; SiO2; nH2O, wherein n is the moles of water of hydration, and the like.

Preferred for this invention is the method whereby the rapidly reacting silane is gradually added to a rapidly stirred solvent which is in direct contact with the porous material. The rapidly reacting silane makes immediate contact with the porous material and decreases the chances of non-uniform use of the reactive silane intermediate.

Also contemplated within the scope of this invention is the method wherein steps (I) and (II) are carried out in the vapor phase by causing the vapors of the reactive silane to contact and react with the porous material.

For example, the porous material is placed in a vacuum reactor and dried under vacuum. The rapidly reacting silane is then allowed to enter the vacuum chamber as a vapor and contact the porous material and after a certain contact time, the byproducts of the reactions are removed under decreased pressure, the vacuum is released, and the porous material removed from the chamber.

As steps (I) and (II) are carried out, it is preferred that the stoichiometry of the reaction between the rapidly reacting silane and the surface hydroxyls is a "starved" stoichiometry, in the sense that there is used much less rapidly reacting silane than would be necessary to react with all of the hydroxyls available on the entire surface of the porous material. Thus, by using this "starved" stoichiometry, one enhances the chances that all of the exterior surface hydroxyls that are accessible will be reacted with the rapidly reacting silane but the porous interior hydroxyls will not, owing to the fact that there simply is not enough rapidly reacting silane to react with all of the hydroxyls of the porous material, and not all of the surface hydroxyls are available for reaction since once the surface hydroxyls are contacted by the silane and reacted with them, the effects of steric hinderance start to reduce the number of surface hydroxyls that are accessible by the silane. Thus, it is obvious that the material resulting from steps (I) and (II) has little or no reactant on the interior surface hydroxyls and therefore, when the "treated" product from steps (I) and (II) is subjected to step (III) of this inventive process, the moiety resulting from the second reactive silane will be found on the interior surfaces of the pores, resulting in a "purer" dual surface material.

Steps (I) and (II) can be carried out in a period of time of from 1 minute to 24 hours. Generally, for purposes of this invention, it is preferred to carry out steps (I) and (II) over about a 30 minute to 6 hour time period to ensure that the exterior surface of the porous material is uniformly treated.

The temperature at which steps (I) and (II) are carried out is not narrowly critical and can range from 0° C. to 400° C. Preferred is a room temperature to 200° C. reaction mixture temperature.

The amount of rapidly reacting silane useful in this invention depends on the number of exterior surface hydroxyls to be reacted. Typically, a stoichiometric equivalent to the exterior surface hydroxyls plus some excess of the rapidly reacting silane is required to treat the surface hydroxyls because of the potential side reactions involved. Typically, 50 to 1000% excess is used. This excess is with respect to the exterior hydroxyl groups. With respect to the total hydroxyls on both the exterior and interior surfaces, the amount of the rapidly reacting silane usually amounts to about 0.001 to 1%. If it is desirable to achieve a somewhat thicker exterior surface treatment, then obviously, somewhat more rapidly reacting silane should be used, up to 67% of the sterically available hydroxyl.

Silanes such as N-(1,1,1-trifluoropropyldimethylsilyl)N-methylacetamide can be used to provide a hydrophobic environment for the exterior surface. N-(vinyldimethylsilyl)N-methylacetamide is an excellent silane to use in this invention because it leaves the vinyldimethylsilyl group on the exterior surface of the porous material. The vinyl group is valuable because once the vinyl group is attached to the surface of the porous material, conventional organic reactions can be used to add to the vinyl group thus creating yet another type of group on the surface of the porous material. For example, when the porous material is treated with N-(vinyldimethylsilyl)N-methylacetamide, one can add HSCH2COOH to the resulting vinyl dimethyl silyl to give a surface group such as HOOCCH2S(CH2)2(CH3)-2SiOSi≡. Using bis(dimethylsilyl)N-methylacetamide gives a surface treatment such as H(CH3)2SiOSi≡ which can also be further reacted with unsaturated molecules to provide further modifications to the surface of the porous material through silicon hydride addition to unsaturated compounds.

In the second phase of the method, i.e. step (III), the material obtained by steps (I) and (II) is contacted with a reactive silane. It should be noted that steps (I) and (II) deal with a "rapidly reacting silane" while step (III) deals with a "reactive silane". For purposes of this invention, what is meant by "reactive silane" is that the silane will react with the surface hydroxyls. This reaction is preferably carried out in bulk solution as the reactive silanes are often neither reactive enough nor volatile enough to use as vapors. Thus, the reactants are mixed together in a solvent solution, with or without, heating. The object of step (III) is to permit the diffusion of the reactive silane into the pores of the porous material and to allow reaction of this silane with the hydroxyl groups that are covalently bonded to the interior surface. In many instances, it is actually the silanol-bearing hydrolysis product of the reactive silane which reacts with the interior surface hydroxyl groups. Such hydrolysis products form from adsorbed water in the porous material. Since the accessible exterior surface hydroxyls of the porous material have been effectively removed by the rapidly reacting silane in steps (I) and (II), the reactive silane does not have available to it accessible reactive sites on the exterior surface of the porous material. Thus, the reactive silane has only the hydroxyls remaining on the interior surfaces of the porous material available for reaction.

Therefore, step (III) must be carried out for a sufficient period of time to allow for the diffusion of the reactive silane into the pores and reaction of the silanes with the interior hydroxyl groups therein (or hydrolysis of the silane and then diffusion of the hydrolyzate into the pore to react). Some of the more highly reactive silanes do not require hydrolysis prior to reaction with the interior hydroxyl groups and may also be used as vapors.

Step (III) can be carried out for a period of time of from several minutes to several hours. As indicated above, this phase of the process depends on the rate of hydrolysis of the reactive silane and the rate of diffusion of the silane, or its hydrolysis product, into the pores of the porous material. Preferred for this invention is a reaction time for step (III) of from 10 minutes to 24 hours. Most preferred is a time of 1 to 6 hours.

The temperature at which step (III) is carried out is more critical than steps (I) and (II), yet it is not narrowly critical. As one would expect, increased temperatures enhance the rate of reaction. Increasing the temperature does not appear to promote too many undesirable side reactions. Thus, the temperature used in step (III) can range from 0° C. to 300° C. Most preferred is the reflux temperature of the reaction at about 70° C. to 120° C.

The amount of reactive silane useful in this invention depends on how many of the surface hydroxyls of the pore interior one wishes to treat. An excess of the reactive silane may be used as this reactive silane does not displace any of the exterior surface groups obtained by steps (I) and (II). Typically, a stoichiometric quantity, based on reactive hydroxyls of the pore surfaces, is used in step (III) herein.

If the reactive silane is very sluggish (e.g., organosilanol), then the reaction should be catalyzed with acid or base, with the proviso that the minimum catalysis required for completion of the reaction be used. The time and temperature of such catalyzed silylations must be carefully adjusted by trial and error to attain adequate interior coverage before the displacement of the covalently bound external group begins.

The reactive silanes useful in step (III) of this invention are those kinds of silanes which are recognized as conventional silylation reagents. Thus, the silanes that are defined as useful in steps (I) and (II) of this invention are also useful in this step of the invention as long as the silanes are chosen such that the silane used in steps (I) and (II) is not the same as the silane chosen in step (III) and vice versa.

Other useful silanes are the common silanes such as those having the general formula $R^{XV}_{4-e}SiX_e$ wherein $R^{XV}$ is independently selected from hydrogen, alkyl groups having 1 to 4 carbon atoms, phenyl, vinyl and allyl; X is a hydrolyzable radical selected from chlorine, alkoxy having 1 to 4 carbon atoms, acetoxy, amine and amido radicals; and e has a value of 1, 2 or 3.

Such silanes and the processes for their manufacture are known in the art and it does not appear that such processes need be set forth in detail herein.

Specific silanes which are useful herein include: trimethylchlorosilane; dimethyldichlorosilane; octodecyldimethylchlorosilane; hexamethyldisilazane; N,N'-bis(trimethylsilyl)urea; N-trimethylsilyldiethylamine; N-trimethylsilylimidazole; N,O-bis(trimethylsilyl)acetamide; N,O-bis(trimethylsilyl)tri-fluoroacetamide); N-methyl-N-trimethylsilyltrifluoroacetamide; t-butyldimethylsilylimidazole; t-butylmethylsilydiimidazole; t-butylsilyltriimidazole; N-trimethylsilylacetamide; N-trimethylsilylpiperidine; hexamethyldisilthiane; O-trimethylsilylacetate; O-trimethylsilyltrifluoroacetate; N-trimethylsilyldimethylamine; N-trimethylsilylmorpholine; N-trimethylsilylpyrrolidine; and N-trimethylsilylacetanilide.

Yet another aspect of this invention is the use in step (III) of organofunctional silanes to silylate the porous material. Such silanes useful in this invention include, for example, (alpha-methacryloxypropyl)trimethoxysilane; (3-aminopropyl)triethoxysilane; gamma-(beta-aminoethylamino)-propyltrimethoxysilane; (gamma-glycidoxypropyl)trimethoxysilane beta-(3,4-epoxycyclohexyl)-ethyltrimethoxysilane; (beta-mercaptoethyl)-trimethoxysilane; (gamma-mercaptopropyl)trimethoxysilane; (gamma-chloropropyl)trimethoxysilane; $CH_2=CHC_6H_4CH_2NH(CH_2)_2NH(CH_2)_3Si(OCH_3)_3 \cdot HCl$; $(CH_3O)_3Si(CH_2)_3N^{\oplus}(CH_3)_2C_{18}H_{37}Cl^-$; $(CH_3)_3Si(CH_2)_3N^{\oplus}(CH_3)_2C_{12}H_{25}Cl^-$; $(CH_3O)_3Si(CH_2)_3N^{\oplus}CH_3 (C_{12}H_{25})_2Cl^-$;

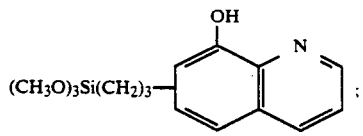

$(CH_3O)_3Si(CH_2)_9CH_3$; $(CH_3O)_3Si(CH_2)_{19}CH_3$, and the like. These silanes will impart a variety of useful chemical properties to the porous interior surface which can be usefully combined with valuable transport properties of the exterior surface groups. For example, the exterior groups may enhance the ion selectivity of chelating groups covalently bonded to the interior surface.

When it is determined that the reaction in step (III) is essentially finished, the product is typically isolated from the reaction mixture. Thus, step (IV) of this process is the isolation of such products from the reaction mixture. This can be accomplished in a number of ways. For example, the liquid can be decanted, the porous material washed and the liquid decanted, successively, or the reaction mixture can be filtered to remove the liquid from the solid product. The final product can be used in this form or it can be dried. If the final product is other than particulate in form, it can be used as is or it can be further shaped and formed without losing beneficial properties. If the material is in a particulate form it can be used as is or it can be compressed, sintered, or otherwise formed.

It is also contemplated within the scope of this invention to prepare a dual surface porous material by eliminating step (III) of the defined process. The elimination of step (III) of the process results in an "intermediate" product wherein the surface of the porous material is first treated by steps (I) and (II) to provide a treated porous material having nonsilanol-containing silicon groups on the exterior surface and hydroxyl groups on the porous interior surface.

Thus, this invention also consists of a method of preparing a dual surface porous material which comprises
(A) contacting a hydroxyl-bearing porous material with less than a stoichiometric equivalent, based on the hydroxyl content of the porous material, of a rapidly reacting silane;

(B) allowing the mixture from (A) to react and form covalent bonds by reaction with the exterior surface hydroxyl groups thereby treating the porous material exterior surface;

(C) subsequently isolating the dual surface porous material from the mixture (B).

Also included within the scope of this invention are the compositions which are intermediates. These compositions consist of a porous material having reacted to its exterior surface, immobilized silicon containing groups, and whose porous interior surface contains hydroxyls.

These intermediates are useful products for the method disclosed supra for providing dual surface materials using reactive silanes to treat the interior pore surfaces.

The dual-surface porous materials of this invention are useful for chelating metals from solution, among other things. The materials, whose surfaces are capable of further modification, such as $H(CH_3)_2SiO-$ and $CH_2=CH(CH_3)_2SiO-$ are useful intermediates in the preparation of other surface-modified porous materials.

Now, so that those skilled in the art may appreciate and understand the invention described herein, the following examples are offered for illustration purposes only. The examples should not be construed as limiting the invention as defined in the claims.

EXAMPLE 1

Porous silica gel discs were prepared by pressing 0.5 gms of silica gel obtained from J. T. Baker Co., Phillipsburg, N.J., U.S.A. (#3405-1 chromatographic beads, 60-200 mesh, 60 angstrom units pore diameter, 300 $m^2/gm$) in a 1¼ inch die for 30 seconds at 30,000 psi. The discs were broken in half and cleaned by heating in a Lindberg Box furnace for 4 hours at 500° C. The disc halves were then stored for a minimum of 24 hours in a moist carbostat to rehydroxylate the surface while retaining the cleanliness of the disc half. The carbostat is an aluminum dessicator containing aluminum shot. It's cleanliness had been assured by regenerating the shot at 500° C. for four hours in the Lindberg furnace prior to use. Rehydroxylation conditions were attained by placing a pan of distilled water in the carbostat.

For the silylation reaction of step (I) and step (II), 1,1,1-trifluoropropyldimethylsilyl-N-methylacetamide was used. Two halves of the cleaned and rehydroxylated discs weighing 0.25 gms each were placed in an ultrahigh vacuum reactor designed and built by the inventors herein. The need for ultrahigh vacuum can be appreciated by considering that at a pressure $10^{-6}$ torr, an otherwise clean surface can be covered by a monolayer of residual gas molecules, mostly water and hydrocarbons, in about two seconds. In the case of partially dehydroxylated silica, this leads to uncontrolled rehydroxylation prior to silylation, as well as, interference by the chemisorbed organics. This is not a critical factor in the silylation reactions on the porous material in a commercialization mode, but this is a fairly critical factor in attempting to establish what affect the silylation reactions have on the porous material for the purpose of establishing that the invention herein is operative.

The half discs were dried at 200° C. for 2 hours under vacuum, and then the reactor was cooled to room temperature and the source of the vacuum was shut off and the vaporous silane indicated above was allowed to enter the chamber containing the half discs for 8 seconds. This time of exposure was calculated based on the approximate number of hydroxyls on the exterior surface of the discs to provide exterior treatment but little or no interior pore treatment. After 8 seconds of flow time, the silane flow was shut off and the silane was allowed to react with the hydroxyls of the discs for a period of 30 minutes. The system was then evacuated overnight (about 16 hours) to a pressure of $10^{-7}$ torr.

The half discs were then exposed to a second reactive silane, trimethylsilyl-N-methylacetamide, by introducing the vaporous silane into the chamber for a period of thirty seconds. The silane and porous material were allowed to contact and react for 30 minutes. No pressure drop occurred after shutting off the flow of silane, suggesting that saturation of the silica discs had occurred. After a two hour evacuation to remove excess reagent and the unreacted silane, the two half discs were removed. One half disc was ground in an alumina mortar and pestle and analyzed for bulk carbon and fluorine, while the other half disc was analyzed using electron spectroscopy for chemical analysis (ESCA). The carbon to silicon and fluorine to silicon atomic ratios measured by ESCA were corrected for carbon blank and for thin layer effects on the measured composition. ESCA detects about the first 50 angstrom units of thickness of material and thus it essentially detects only the exterior treatment in as much as the silica gel used in this example had a pore diameter of about 60 angstrom units. The corrected carbon to silicon and fluorine to silicon ratios were then used to infer the mole percents of $CF_3CH_2CH_2(CH_3)_2Si-$ and $(CH_3)_3Si-$ on the exterior surface of the silica gel. The mole percents were determined for the interior surface by the use of the bulk weight percent carbon and fluorine in the usual manner and correcting for the amounts detected in a similar but untreated silica gel disc. Bulk analysis is appropriate for such characterization because the interior surface accounts for more than 99% of the total surface area in porous materials.

The analysis showed that the silica gel had been treated 100% with $CF_3CH_2CH_2(CH_3)_2Si-$ on the exterior surface and 97% $(CH_3)_3Si-$ treatment on its interior pores.

EXAMPLE 2

When the steps in example 1 were essentially repeated but the exterior surface was treated with trimethylsilyl-N-methylacetamide and the interior surface was treated with 1,1,1-trifluoropropyldimethylsilyl-N-methylacetamide, the result was that the surface was treated to 90% with $(CH_3)_3Si-$ groups and the interior surface was treated with 34% of $CF_3CH_2CH_2(CH_3)_2Si-$ groups.

EXAMPLE 3

Silica gel, 4.5 grams (as used in example 1) was dried in a Cole Parmer vacuum oven for 16 hours at 180° C. at a pressure of 25 millitorr. This silica, along with 100 cc of dried hexane (over $CaH_2$), was charged into a 250 cc. 3-necked glass flask equipped with a thermometer, a magnetic stirrer, a 100 cc addition funnel, and a water-cooled condenser fitted with a dry nitrogen sweep. With vigorous stirring, the mixture was heated to a reflux temperature of 69° C. and a solution of 0.7847 grams of 1,1,1-trifluoropropyldimethylsilyl-N-methylacetamide in 36.65 cc of dry hexane was added slowly via the addition funnel. Reflux was maintained for 2 hours subsequent to the silane addition. The silica gel, so treated, was then isolated by filtration and washed once with 20 cc hexane and three times with 20 cc portions of ethyl ether. A two hour evacuation at 80° C. and 25 millitorr was employed to free the silica gel from residual solvent. A portion of the silica gel was then analyzed for bulk carbon and fluorine, while the remainder of the silica gel was analyzed using ESCA.

As in example 1, blank adjusted ESCA values for the surface fluorine to silicon ratio were used to infer the mole percent of $CF_3CH_2CH_2(CH_3)$ Si— on the exterior surface of the silica gel. Blank adjusted bulk weight percent fluorine was compared to the theoretical fluorine level for a fully (both exterior and interior surface silanols) derivatized silica to determine the mole percent $CF_3CH_2CH_2(CH_3)_2$ Si— and infer the mole percent silanol on the interior surface of the silica gel.

The analysis showed that the silica gel had been treated 74% with $CF_3CH_2CH_2(CH_3)_2$ Si— on the exterior surface while the interior surface remained 93.7% ≡SiOH functional and only contained 6.3% $CF_3CH_2CH_2(CH_3)_2$ Si— treatment.

Abbott in U.S. Pat. No. 4,298,500, issued Nov. 3, 1981 has disclosed that his compositions are "mixed phase" packing materials and the examples herein show that his materials are indeed "mixed phase", as opposed to the inventive compositions which are truly dual surface.

The compositions of the claims of the instant invention are novel compositions of matter in which the outer portion or zone of a porous material bears an enriched concentration, relative to the inner zone, of a residue immobilized on the external and internal surface. The residue is immobilized by a covalent bond to the surface. The residue is small enough to fit within the porous interior, but it's concentration will be enriched in the outer zone due to the method of manufacture.

Such dual zone materials are made by bringing a substoichiometric amount of an ultrareactive silylating agent into contact with a porous material that bears surface hydroxyl groups, such as silica gel, zirconia gel, etc. The region or zone where the residue is immobilized is determined by the relative rates of diffusion of the silylating agent into the pore versus it's capture on the pore walls via chemical reaction with the reactable surface hydroxyl groups. When the reaction rate is very fast, most of the agent will be converted to the immobilized residue before it can reach deep regions in the material. The thickness of this outer zone where most of the first residue is immobilized will, of course, depend on how much of the first agent is used relative to the amount of reactable surface hydroxyls.

A second silylating agent can then be added to immobilize a second residue by reaction with the remaining hydroxyl groups which are mostly but not totally, in the inner zone.

DETAILED DESCRIPTION OF THE DRAWINGS

FIG. 1 is an artist's illustration of a cross section through a dual surface material. A first residue 1 is illustrated by the black dots. A second residue 2 is illustrated by the white dots. A third residue 3, are the hydroxyl groups that may be left from the two reactions that have occurred during the process of the instant invention. The first residue 1, is enriched on the external surface 4 of the material. In this figure, the external surface 4 is tantamount to the geometric exterior of the porous particle. The external surface 4 can be comprised of up to 50% of the particle if more of the first agent were used. FIG. 1 also illustrates that some residual accessible hydroxyl groups are still present. Note that the two residues of the dual surface are separated from each other into two distinct zones or phases, rather than occurring as a single mixed phase.

FIG. 2 is an artist's illustration showing a cross section through a mixed phase composition of the type described in the Abbott patent alluded to above. Note that the two different residue, the Abbott residue 5, illustrated by the black dots, and the Abbott residue 6, illustrated by the white dots are randomly distributed over the Abbott external surface 7 and the Abbott internal surface 8. Regardless of how deeply one probes into the particle, the local surface composition is similar, in this case, the composition is comprised of 25% first Abbott residue 5 and 75% of the second Abbott residue 6.

The relative dimensions in these figures have been distorted in order to explain the structural difference between a dual zone material and a mixed phase composition. Typically, chromatographic particles have a particle diameter which is greater than 100 times the diameter of the pores, which in the figures, are drawn as the clear spaces 9 between the solid matrix material in the figures. The surface area by which chromatographic particles adsorb compounds and biopolymers resides primarily in the interior where greater than 99% of the surface area exists, so that the size of adsorbed biopolymers must be less than that of the pore diameter and consequently much less than that of the particle diameter.

Separation distance between the two types of residues in dual zone materials is on the order of the size of the particle itself. This is far different than the separation distance between the two types of residues in a mixed phase composition. In the latter case, the separation distance is a consequence of random immobilization events and thus, is smaller by orders of magnitude than the size of the particle. This conclusion is consistent with the Abbott teaching that improved adsorption results from mixed phase composition. The separation between residues must be comparable in magnitude to that of the biopolymer size itself in order for the adsorption of that biopolymer to the surface to be affected by the presence of both residues.

The separation into two zones of the two different residues is the unique structural feature of dual surface materials of the instant invention. This feature can be detected by contrasting the external surface composition with that of the average surface composition. The external surface composition can be determined by surface selective analysis such as by Electron Spectroscopy for Chemical Analysis (ESCA) which detects only the top 5 to 10 nM of the material. The average total composition which is dominated by the greater than 99% of the surface area that lies below the top 10 nM can be determined by bulk analysis for an element unique to the residues. For example, the $CF_3CH_2CH_2(CH_3)_2Si—$ residue immobilized on silica gel provides both carbon and fluorine for both surface and bulk analysis that distinguishes the residue from the porous silica gel.

There are often minor differences between the external and the average surface composition due to random scatter in analytical results. Furthermore, real differences between the two compositions must be large enough to significantly affect properties of the materials. Dual surface character for the material prepared by the sequential treatment of the porous material, using the method of this invention exists when certain conditions exist, said conditions being selected from the groups consisting of $$\frac{\Gamma_1(E)}{\Gamma_1(A)} \geq 1.5, \Gamma_1(E) \geq 0.3 \text{ molecules}/nM^2 \text{ and} \quad (a)$$
$$\Gamma_2(A) \geq 0.1 \text{ Molecules}/nM^2$$

$$\frac{\Gamma_1(E)}{\Gamma_1(A)} \geq 1.5, \Gamma_1(E) \geq 15\% \text{ of saturation of the} \quad (b)$$
surface of the porous material; and
$$\Gamma_2(A) \geq 5\% \text{ of saturation of the}$$
surface of the porous material wherein $\Gamma(E)$ is the external surface density in Molecules/$nM^2$ as inferred by Electron Spectroscopy Chemical Analysis, and wherein $\Gamma_1(A)$ and $\Gamma_2(A)$ are like measurements of average surface density as measured by bulk analysis, and wherein subscripts 1 and 2 refer to the groups immobilized in reaction steps II and III, respectively.

To show how these conditions are applied, the following demonstrations are given.

The experimental data from which the values for percent surface coverage of example 1, above, were derived are as follows:

$$\Gamma_1(E) = 1.48$$

$$\Gamma_1(A) = 0.072$$

Therefore, the product described in example 1 fits condition (a) and is thus a dual zone material.

The experimental data from which the values for percent surface coverage of example 2, above, were derived are as follows:

$$\Gamma_2(E) = 0.16$$

$$\Gamma_2(A) = 0.73$$

Therefore, the product described in example 2 fits condition (a) and is thus a dual zone material.

The experimental data from which the values for percent surface coverage of example 3, above, were derived are as follows:

$$\Gamma_1(E) = 1.28$$

$$\Gamma_1(A) = 0.535$$

Therefore, the product described in example 3 fits condition (a) and is thus a dual zone material.

EXAMPLE 4

Mixed Phase Compositions Per Abbott's Method (A Comparative Example)

The following two examples of mixed phase compositions showed negligible dual zone character. They were made by attaching a substoichiometric amount of the residue $CF_3CH_2CH_2(CH_3)_2Si$— (hereinafter TFS) to silica gel followed by saturating the remaining reactable surface hydroxyls with $(CH_3)_3Si$— (hereinafter TMS) residue. The first residue was attached using the chlorosilane derivative. Chlorosilanes are common silylating agents that are known to be more reactive than organosilanols or the silanol precursors (silyl methoxy derivatives) set forth in Abbott's patent. The silica gels had pore diameters of 6 nM (Baker Silica Gel as was used in the examples of the instant invention disclosure), and 25 nM (Amicon Brand Silica), but in neither case was a substantial amount of dual zone character displayed. When these residues are attached to such silica in amounts comparable to the below samples using ultrafast silylating agents and conditions under which the agent is not completely converted to a slower agent, then substantial dual zone character meeting the criteria of (a) and/or (b), is obtained.

Sample A: One gram ($1.04 \times 10^{-3}$ equivalents of hydroxyl at 2.4 hydroxyls/square nM) of undried Amicon Silica gel, Lot SNR -22-092, and 120 ml. of hexane were sonicated 5 minutes to wet the silica and then the slurry was placed into a 500 ml., three-necked, indented, round-bottomed flask equipped with an air motor driven paddle stirrer and a condenser surmounted with a $N_2$ sweep. Then 32.4 microliters 0.44 m/$nM^2$ (molecules per square nanometer) of $CF_3CH_2CH_2(CH_3)_2SiCl$ (hereinafter TFS-Cl) were rapidly added within about ten seconds using a microsyringe. The slurry was stirred ten minutes to allow diffusion into the pores. Then 15.6 microliters (0.44 m/$nM^2$) of pyridine was added from a microsyringe to catalyze the reaction and the slurry was heated to reflux for one hour to complete the reaction. The treated silica was washed twice with hexane, once with ethanol, and thrice with ether to remove soluble by-products and then dried at 80° C. for 3 hours under vacuum. Then 0.35 grams (less than $0.36 \times 10^{-3}$ equivalents of hydroxyl) of this dried, treated silica and 50 ml. of hexane were placed in a 200 ml., single-necked flask along with 77 microliters (3.4 m/$nM^2$) of $(CH_3)_3SiN(CH_3)C(O)CH_3$ (hereinafter TMSA) in 15 ml. of hexane and the slurry heated to reflux for one hour. After cooling the silica was isolated from the solution via filtration and washed and dried as in the previous material preparation, prior to ESCA and bulk elemental analysis.

Bulk analysis gave values of 0.77 weight % fluorine and 2.91 weight % carbon, corresponding to average surface concentrations of 0.33 m/$nM^2$ for TFS and 1.44 m/$nM^2$ for TMS. External surface analysis by ESCA gave a value of 0.089 F/Si, corresponding to a concentration at the external surface of 0.35 m/$nM^2$ of TFS. The value of 260 $M^2$/gram for the specific surface area of the silica was used to convert bulk analytical values to average surface concentrations. Calculation of the external surface concentration was made using reference values of 0.285 F/Si and 2.53 weight % F. These reference values were obtained for another portion of the same lot of silica which had been thoroughly treated with excess TFS-Cl so that no concentration gradient or dual zone character could exist.

The surface concentration of the TFS residue was about the same on the exterior as it was on the average, proving that appreciable dual zone character did not occur in this conventionally silylated material in which two consecutive silylating agents were used. Neither of the listed conditions a or b for dual zone character were met.

Sample B: One gram ($1.2 \times 10^{-3}$ equivalents hydroxyl at 2.4 hydroxyl/$nM^2$) of Baker silica gel, catalog number 3405-1, which was dried at 180° C. for 16 hours under vacuum, was similarly reacted with 60.8 microliters (0.72 m/$nM^2$) of TFS-Cl and catalyzed by 29.2 microliters (0.72 m/$nM^2$) of pyridine. Then 0.35 grams (less than $0.4 \times 10^{-3}$ equivalents hydroxyl) of the similarly washed and dried treated silica was reacted with 77 microliters (2.8 m/nM$^2$) of TMSA just as for the Amicon silica, above. The washed and dried final product was analyzed by ESCA and bulk elemental analysis.

Bulk analysis gave values of 1.16 weight % Fluorine and 3.07 weight % Carbon, corresponding to an average surface concentration of 0.44 m/nM$^2$ for TFS and 1.11 m/nM$^2$ for TMS. External surface composition by ESCA gave a value of 0.136 F/Si. corresponding to a concentration at the external surface of 0.54 m/nM$^2$ TFS. The value of 300 M$^2$/gram for the specific surface area of this silica was used to convert bulk analytical values to average surface concentrations. Calculation of the external surface concentration was made using reference values of 0.412 F/Si and 4.10 weight % Fluorine. These reference values were obtained for another portion of the Baker silica which had been thoroughly treated with excess $CF_3CH_2CH_2(CH_3)_2SiN(CH_3)C(O)CH_3$ so that no concentration gradient and hence no dual zone character could exist.

The surface concentration of the TFS residue was about the same on the exterior as it was on the average, proving that appreciable dual zone character did not occur in this conventionally silylated material in which two consecutive silylating agents were used. Neither of the conditions a or b for dual zone character were met.

That which is claimed is:

1. A method of silylating a porous material having an external zone which comprises the external surfaces of the porous material and having an internal zone which comprises the internal surfaces of the porous material, comprising:
   (I) contacting a hydroxyl-bearing porous material with less than a stoichiometric equivalent, based on the hydroxyl content of the porous material, of a rapidly reacting silane;
   (II) allowing the mixture from (I) to react and form covalent bonds by reaction with the exterior surface hydroxyl groups thereby treating the porous material exterior surface;
   (III) thereafter, contacting and mixing the treated porous material from (II) with a second reactive silane, different than the silane of steps (I) and (II), for a period of time to allow the reactive silane, or its silanol-bearing hydrolysis product, to diffuse into the interior of the porous material and covalently bond by reaction with hydroxyl groups on the interior surface of the porous material, and
   (IV) subsequently isolating the silylated porous material from the mixture of (III).

2. A method as claimed in claim 1, wherein in step (I), the rapidly reacting silane is gradually added to a liquid suspension of the porous material.

3. A method as claimed in claim 1, wherein in step (I), the rapidly reacting silane is gradually added to a rapidly stirred solvent which is in direct contact with nonparticulate porous material.

4. A method as claimed in claim 1, wherein in step (I), the rapidly reacting silane as a vapor in a vacuum is intimately contacted with the porous material.

5. A method as claimed in claim 1, wherein in step (I), a carrier gas is used to bring a vapor of the rapidly reacting silane into contact with the porous material.

6. A method as claimed in claim 1 wherein in step (III), the product from step (II) is contacted with a reactive silane in solution.

7. A method as claimed in claim 1 wherein in step (III), the product from step (II) is contacted with a vapor of a reactive silane.

8. A method as claimed in claim 1 wherein step (I) and step (II) are carried out at a temperature in the range of 0° C. to 400° C.

9. A method as claimed in claim 1 wherein step (I) and step (II) are carried out at a temperature in the range of 20° C. to 200° C.

10. A method as claimed in claim 1 wherein step (III) is carried out at a temperature in the range of 0° C. to 300° C.

11. A method as claimed in claim 1 wherein step (III) is carried out at a temperature in the range of 70° C. to 120° C.

12. A method as claimed in claim 1 wherein there is used an aprotic solvent in step (I).

13. A composition of matter comprising a silylated porous material having an external zone which comprises the external surfaces of the porous material and having an internal zone which comprises the internal surfaces of the porous material which has been prepared by a method comprising
   (I) contacting a hydroxyl-bearing porous material with less than a stoichiometric equivalent, based on the hydroxyl content of the porous material, of a rapidly reacting silane;
   (II) allowing the mixture from (I) to react and form covalent bonds by reaction with the exterior surface hydroxyl groups thereby treating the porous material exterior surface;
   (III) thereafter, contacting and mixing the treated porous material from (II) with a second reactive silane, different than the silane of steps (I) and (II), for a period of time to allow the reactive silane, or its silanol-bearing hydrolysis product to diffuse into the interior of the porous material and covalently bond by reaction with hydroxyl groups on the interior surface of the porous material, and
   (IV) subsequently isolating the silyated porous material from the mixture of (III).

14. A composition as claimed in claim 13 wherein the groups formed by steps (I) and (II) are derived from rapidly reacting silanes selected from a group consisting of
   (i) disubstituted amides wherein the amides are selected from a group consisting of
   (a) N,N-disubstituted amides having the general formula

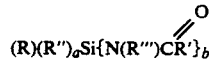

and
   (b) N,O-disubstituted amides having the general formula

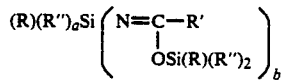

wherein in said formulae, R is selected from hydrogen, allyl, vinyl and Q wherein Q is selected from a group consisting of
   (a) alkyl groups having less than twenty carbon atoms, (b) aryl groups having less than twenty carbon atoms,
(c) —(CH$_2$)$_2$CF$_3$,
(d) —(CH$_2$)$_3$Cl,
(e) —(CH$_2$)$_3$SR$^{iv}$,
(f) —(CH$_2$)$_3$NR$_2^{iv}$,
(g) —(CH$_2$)$_3$N(R$^{iv}$) (CH$_2$)$_2$N(R$^{iv}$)$_2$,
(h)

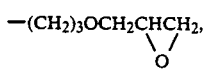

(i)

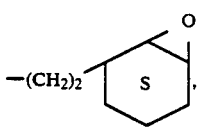

(j) —(CH$_2$)$_3$OC(O)C(CH$_3$)=CH$_2$,
(k)

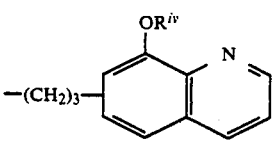

and
(l) —C$_2$H$_4$C$_n$F$_{2n+1}$ wherein R'' is independently selected from methyl, ethyl and phenyl groups; R''' is selected from methyl, ethyl and phenyl groups, R' is substituted or unsubstituted alkyl group of from 1 to 6 carbon atoms or hydrogen; R$^{iv}$ is selected from methyl, ethyl and phenyl groups; a+b has a value of 3 and neither a nor b has a value of zero;

(ii) substituted amines wherein the amines are selected from a group consisting of
(a) N,N,N-trisubstituted amines having the general formula (R$^v$)(R$^{vi}$)$_c$Si(NR$^{vii}$$_2$)$_d$ and
(b) heterocyclic amines, wherein the heterocyclic amines are selected from the group consisting of

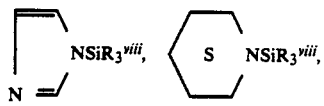

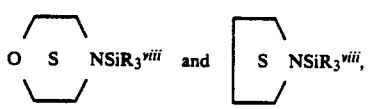

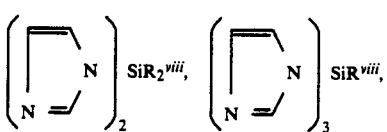

-continued

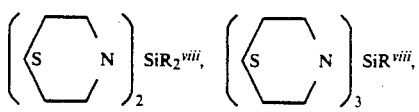

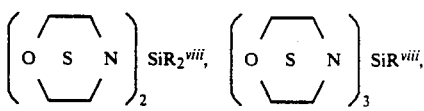

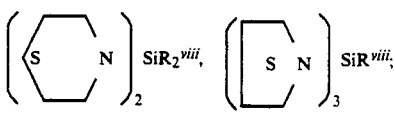

wherein in said formulae R$^v$ and R$^{viii}$ are selected from a group consisting of hydrogen, allyl, vinyl and Q' wherein Q' is selected from a group consisting of
(a) alkyl groups having less than twenty carbon atoms,
(b) aryl groups having less than twenty carbon atoms,
(c) —(CH$_2$)$_2$CF$_3$,
(d) —(CH$_3$)$_3$SR$^{ix}$,
(e) —(CH$_2$)$_3$NR$_2^{ix}$,
(f) —(CH$_2$)$_3$N(R$^{ix}$)(CH$_2$)$_2$N(R$^{ix}$)$_2$,
(g)

—(CH$_2$)$_3$OCH$_2$CHCH$_2$,
\\ /
O (h)

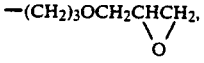

(i) —(CH$_2$)$_3$OC(O)C(CH$_3$)=CH$_2$,
(j)

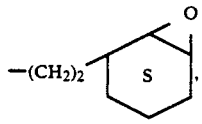

and
(k) —C$_2$H$_4$C$_n$F$_{2n+1}$ wherein R$^{vi}$ is indepentently selected from methyl, ethyl and phenyl groups, R$^{vii}$ is independently selected from methyl, ethyl and phenyl groups, R$^{ix}$ is independently selected from alkyl groups of 1 to 6 carbon atoms and phenyl groups; c+d has a value of 3 and neither c nor d has a value of zero; and (iii) thioethers selected from the group consisting of
(a) thioethers having general formula R$^x$R$_2^{xi}$SiSR$^{xii}$ and (b) thioethers having the general formula (R$^x$R$_2^{xi}$Si)$_2$S wherein in said formulae, R$^x$ is selected from a group consisting of hydrogen, allyl, vinyl and Q" wherein Q" is selected from a group consisting of
(a) alkyl groups having less than twenty carbon atoms,
(b) aryl groups having less than twenty carbon atoms,
(c) —(CH$_2$)$_2$CF$_3$,
(d) —(CH$_3$)$_3$SR$^{xiii}$,
(e) —(CH$_2$)$_3$NR$_2$$^{xiii}$,
(f) —(CH$_2$)$_3$NR$^{xiii}$(CH$_2$)$_2$N(R$^{xiii}$)$_2$,
(g)

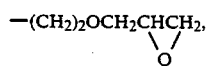

(h)

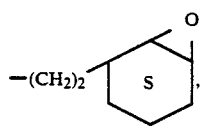

(i) —(CH$_2$)$_3$OC(O)C(CH$_3$)=CH$_2$;
(j)

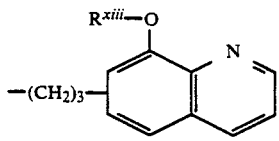

and
(k) —C$_2$H$_4$C$_n$F$_{2n+1}$

R$^{xi}$ is indendently selected from methyl, ethyl and phenyl groups; R$^{xii}$ is independently selected from methyl, ethyl and phenyl groups, R$^{xiii}$ is independently selected from alkyl groups having 1 to 6 carbon atoms and phenyl.

15. A composition of matter consisting of silylated porous material having an external zone which comprises the external surfaces of the porous material and having an internal zone which comprises the internal surfaces of the porous material which has been prepared by a method comprising
(I) contacting a hydroxyl-bearing porous material with less than or equal to two-thirds of the amount representing saturation coverage of a residue from silanes having rapidly reacting leaving groups, based on the hydroxyl content of the porous material, of a silane having rapidly leaving groups, said silane selected from a group consisting of
(i) disubstituted amidosilanes wherein the amidosilanes are selected from a group cosisting of:
(a) N,N-disubstituted amidosilanes having the general formula

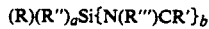

and
(b) N,O-disubstituted aminosilanes having the general formula

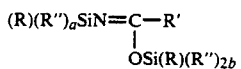

wherein in said formulae, R is selected from hydrogen, allyl, vinyl and Q wherein Q is selected from a group consisting of
(a) alkyl groups having less than twenty carbon atoms,
(b) aryl groups having less than twenty carbon atoms,
(c) —(CH$_2$)$_2$CF$_3$,
(d) —(CH$_2$)$_3$Cl,
(e) —(CH$_2$)$_3$SR$^{iv}$,
(f) —(CH$_2$)$_3$NR$_2$$^{iv}$,
(g) —(CH$_2$)$_3$N(R$^{iv}$)(CH$_2$)$_2$N(R$^{iv}$)$_2$,
(h)

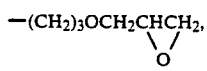

(i)

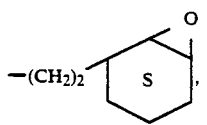

(j) —(CH$_2$)$_3$OC(O)C(CH$_3$)=CH$_2$,
(k)

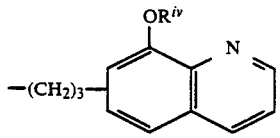

and
(l) —C$_2$H$_4$C$_n$F$_{2n+1}$,
wherein n is at least 2; R" is independently selected from methyl, ethyl and phenyl groups; R'" is selected from methyl, ethyl and phenyl groups; R' is a substituted or unsubstituted alkyl group of from 1 to 6 carbon atoms or hydrogen; R$^{iv}$ is selected from methyl, ethyl and phenyl groups; a+b has a value of 3 and b does not have a value of zero;
(ii) substituted aminosilanes wherein the aminosilanes are selected from a group consisting of
(a) N,N,N-trisubstituted aminosilanes having the formula (R$^v$)(R$^{vi}$)$_c$Si(NR$^{vii}$$_2$)$_d$ and
(b) heterocyclic aminosilanes, wherein the heterocyclic aminosilanes are selected from the group consisting of

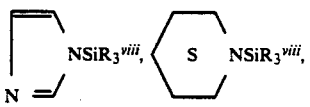

-continued

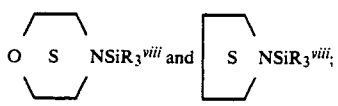

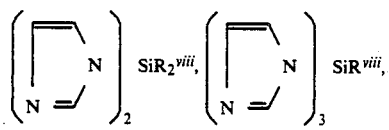

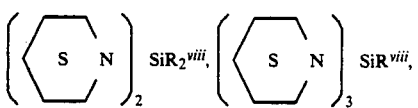

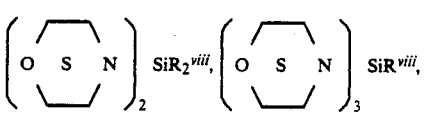

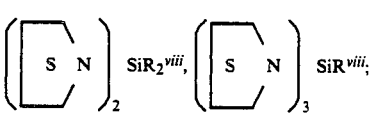

(iii) thioethersilanes selected from the group consisting of thioethersilanes having the general formula (a) $R^xR_2^{xi}SiSR^{xii}$ and (b) $(R^xR_2^{xi}Si)_2S$ wherein in said formulae, $R^x$ is selected from a group consisting of hydrogen, allyl, vinyl and Q" wherein Q" is selected from a group consisting of
(a) alkyl groups having less than twenty carbon atoms,
(b) aryl groups having less than twenty carbon atoms,
(c) —$(CH_2)_2CF_3$,
(d) —$(CH_3)_3SR^{xiii}$,
(e) —$(CH_2)_3NR_2^{xiii}$,
(f) —$(CH_2)_3N(R^{xiii})(CH_2)_2NR^{xiii}{}_2$,
(g)

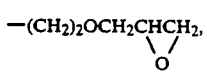

(h)

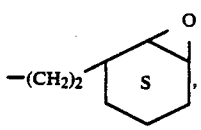

(i) —$(CH_2)_3OC(O)C(CH_3)=CH_2$,
(j)

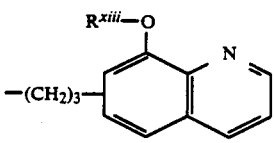

and
(k) —$C_2H_4C_nF_{2n+1}$, wherein n is at least 2; $R^{xi}$ is independently selected from methyl, ethyl and phenyl groups; $R^{xii}$ is independently selected from methyl, ethyl and phenyl groups, $R^{xiii}$ is independently selected from alkyl groups having 1 to 6 carbon atoms and phenyl;

(II) allowing the mixture from (I) to react and form covalent bonds by reaction with the surface hydroxyl groups thereby predominantly treating the porous exterior surface;

(III) thereafter, contacting and mixing the treated porous material from (II) with a second silane, different than the silane of steps (I) and (II), for a period of time to allow the silane, or its silanol-bearing hydrolysis product, to diffuse into the interior of the porous material and covalently bond by reaction with hydroxyl groups on the interior surface of the porous material;

(IV) subsequently isolating the silulated porous material from the mixture of (III), wherein silulated porous material character exists when certain conditions exist, said conditions being selected from the group consisting of $$\frac{\Gamma_1(E)}{\Gamma_1(A)} \geq 1.5, \Gamma_1 \geq 0.3 \text{ molecules/nM}^2 \text{ and} \quad (a)$$

$$\Gamma_2(A) \geq 0.1 \text{ molecules/nM}^2$$

$$\frac{\Gamma_1(E)}{\Gamma_1(A)} \geq 1.5 \text{ and } \Gamma_1(E) \geq 15\% \text{ of saturation of the} \quad (b)$$

surface of the porous material; and $\Gamma_2(A) \geq$

5% of saturation of the surface of the porous material wherein $\Gamma_1(E)$ is the external surface density in Molecules/nM$^2$ as inferred by a method which selectively analyzes the external surface such as Electron Spectroscopy for Chemical Analysis, and wherein $\Gamma_1(A)$ and $\Gamma_2(A)$ are like measurements of average surface density as measured by bulk analysis, and wherein subscripts 1 and 2 refer to the treated material of steps II and III, respectively.

16. A composition as claimed in claim 15, wherein the groups formed by steps (I) and (II) are derived from amidosilanes consisting of disubstituted amidosilanes having the general formula

and wherein R is selected from hydrogen, allyl, vinyl, and Q wherein Q is selected from a group consisting of
(a) alkyl groups having less than twenty carbon atoms,
(b) aryl groups having less than twenty carbon atoms,
(c) —$(CH_2)_2CF_3$,
(d) —$(CH_2)_3Cl$,
(e) —$(CH_2)_3SR^{iv}$,
(f) —$(CH_2)_3NR_2^{iv}$,
(g) —$(CH_2)_3N(R^{iv})(CH_2)_2N(R^{iv})_2$,
(h)

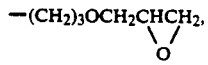

(i) 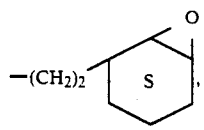

(j) —(CH₂)₃OC(O)C(CH₃)=CH₂, (k) 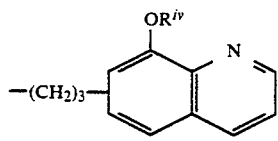

and (l) —C₂H₄C$_n$F$_{2n+1}$, where n is at least 2, R' is a substituted or unsubstituted alkyl group of from 1 to 6 carbon atoms or hydrogen; R" and R'" are each independently selected from methyl, ethyl and phenyl groups; a+b has a value of 3 and neither a nor b has a value of zero.

17. A composition as claimed in claim 16 wherein the disubstituted amidosilane has the formula

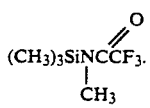

18. A composition as claimed in claim 16 wherein the disubstituted amidosilane has the formula

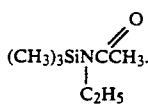

19. A composition as claimed in claim 16 wherein the disubstituted amidosilane has the formula

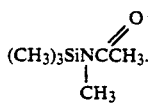

20. A composition as claimed in claim 16 wherein the disubstituted amidosilane has the formula

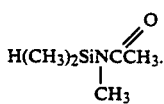

21. A composition as claimed in claim 16 wherein the disubstituted amidosilane has the formula

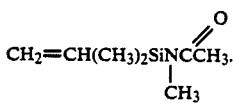

22. A composition as claimed in claim 16 wherein the disubstituted amidosilane has the formula

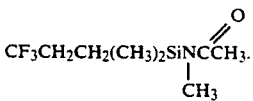

23. A composition as claimed in claim 15 wherein the groups formed by steps (I) and (II) are derived from amidosilanes consisting of disubstituted amidosilanes having the general formula

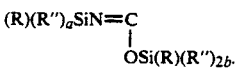

wherein R is selected from hydrogen, allyl, vinyl and Q wherein Q is selected from (a) alkyl groups having less than twenty carbon atoms,
(b) aryl groups having less than twenty carbon atoms,
(c) —(CH₂)₂CF₃,
(d) —(CH₂)₃Cl,
(e) —(CH₂)₃SR$^{iv}$,
(f) —(CH₂)₃NR₂$^{iv}$,
(g) —(CH₂)₃N(R$^{iv}$)(CH₂)₂N(R$^{iv}$)₂,
(h)

—(CH₂)₃OCH₂CHCH₂,
   \\O/

(i) 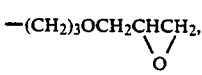

(j) —(CH₂)₃OC(O)C(CH₃)—CH₂, (k) 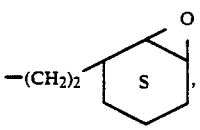

and (l) —C₂H₄C$_n$F$_{2n+1}$, wherein n is at least 2; R' is a substituted or unsubstituted alkyl group of from 1 to 6 carbon atoms or hydrogen and R" and R$^{iv}$ are independently selected from methyl, ethyl and phenyl groups.

24. A composition as claimed in claim 23 wherein the disubstituted amidosilane has the formula

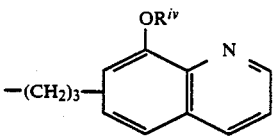

25. A composition claimed in claim 23 wherein the disubstituted amidosilane has the formula

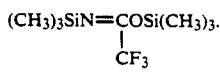

26. A composition as claimed in claim 15 wherein the groups formed by steps (I) and (II) are derived from aminosilanes which are N,N,N trisubstituted aminosilanes having the general formula $(R^v)(R^{vi})_c Si(NR^{vii}{}_2)_d$ wherein $R^v$ and $R^{vii}$ are selected from a group consisting of hydrogen, allyl, vinyl and Q' wherein Q' is selected from a group consisting of
    (a) alkyl groups having less than twenty carbon atoms,
    (b) aryl groups having less than twenty carbon atoms,
    (c) $-(CH_2)_2CF_3$,
    (d) $-(CH_3)_3SR^{ix}$,
    (e) $-(CH_2)_3NR_2^{ix}$,
    (f) $-(CH_2)_3N(R^{ix})(CH_2)_2N(R^{ix})_2$,
    (g)

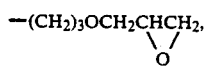

(h)

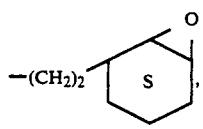

(i) $-(CH_2)_3OC(O)C(CH_3)=CH_2$,
    (j)

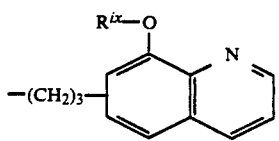

and
    (k) $-C_2H_4C_nF_{2n+1}$, wherein n is at least 2; each $R^{vii}$ is independently selected from methyl, ethyl and phenyl groups, $R^{ix}$ is independently selected from alkyl groups of 1 to 6 carbon atoms and phenyl groups; c+d has a value of 3 and neither c nor d has a value of zero.

27. A composition as claimed in claim 26 wherein the trisubstituted aminosilane has the formula $(CH_3)_3SiN(C_2H_5)_2$.

28. A composition as claimed in claim 26 wherein the trisubstituted aminosilane has the formula $(CH_3)_3SiN(CH_3)_2$.

29. A composition as claimed in claim 15 wherein the groups formed by steps (I) and (II) are derived from aminosilanes which are heterocylic aminosilanes which are selected from a group consisting of

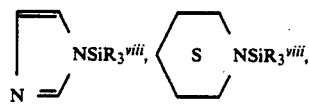

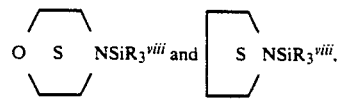

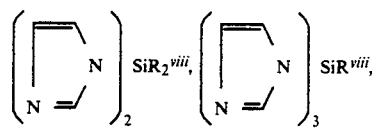

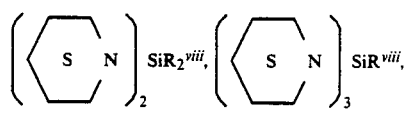

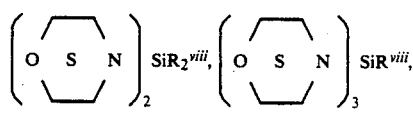

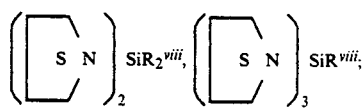

wherein $R^{viii}$ is independently selected from a group consisting of hydrogen, allyl, vinyl and Q' wherein Q' is selected from a group consisting of
    (a) alkyl groups having less than twenty carbon atoms,
    (b) aryl groups having less than twenty carbon atoms,
    (c) $-(CH_2)_2CF_3$,
    (d) $-(CH_3)_3SR^{ix}$,
    (e) $-(CH_2)_3NR_2^{ix}$,
    (f) $-(CH_2)_3N(R^{ix})(CH_2)_2N(R^{ix})_2$,
    (g)

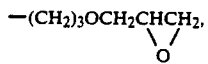

(h)

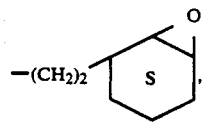

(i) $-(CH_2)_3OC(O)C(CH_3)=CH_2$,
    (j)

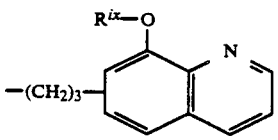

and
    (k) $-C_2H_4C_nF_{2n+1}$, wherein n is at least 2; $R^{ix}$ is independently selected from alkyl groups of 1 to 6 carbon atoms and phenyl groups; c+d has a value of 3 and neither c nor d has a value of zero.

30. A composition as claimed in claim 29 wherein the heterocyclic aminosilane has the formula

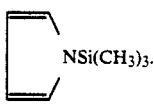

31. A composition as claimed in claim 29 wherein the heterocyclic aminosilane has the formula

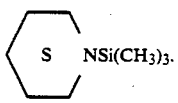

32. A composition as claimed in claim 29 wherein the heterocyclic aminosilane has the formula

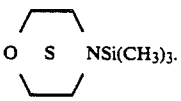

33. A composition as claimed in claim 29 wherein the hetrocyclic aminosilane has the formula

34. A composition as claimed in claim 15 wherein the groups formed by steps (I) and (II) are derived from thioethersilanes having the general formula $(R^x)(R^{xi})_2$-$SiS(R^{xii})$ wherein $R^x$ is selected from a group consisting of hydrogen, allyl, vinyl and Q" wherein Q" is selected from a group consisting of (a) alkyl groups having less than twenty carbon atoms,
(b) aryl groups having less than twenty carbon atoms,
(c) —$(CH_2)_2CF_3$,
(d) —$(CH_3)_3SR^{xiii}$,
(e) —$(CH_2)_3NR_2^{xiii}$,
(f) —$(CH_2)_3NR_2^{xiii}$,
(g)

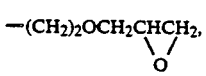

(h)

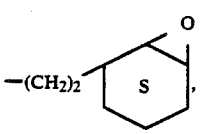

(i) —$(CH_2)_3OC(O)C(CH_3)$=$CH_2$,
(j)

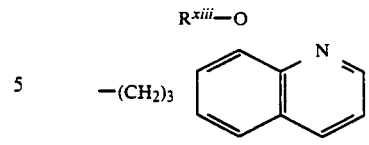

and
(k) —$C_2H_4C_nF_{2n+1}$,
wherein n is at least 2; $R^{xi}$ and $R^{xii}$ are each independently selected from methyl, ethyl, and phenyl groups; $R^{xiii}$ is independently selected from alkyl groups having 1 to 6 carbon atoms and phenyl groups.

35. A composition as claimed in claim 34 wherein the thioethersilane has the formula $(CH_3)_3SiSCH_3$.

36. A composition as claimed in claim 34 wherein the thioethersilane has the formula $(CH_3)_3SiS(CH_2)_5CH_3$.

37. A composition as claimed in claim 15 wherein the groups reacted to the porous interior surface in step (III) are derived from silanes having the general formula $(R^{xvi}O)_f(R^{xvii})_gSiQ'''_h$ wherein $R^{xvi}$ is an alkyl radical having 1 to 4 carbon atoms or hydrogen; $R^{xvii}$ is an alkyl radical of 1 to 4 carbon atoms or phenyl; the value of f is 1, 2 or 3; the value of g is 0, 1 or 2: the value of h is 1 or 2 wherein f+g+h equals 4; Q''' is a radical selected from a group consisting of (a) —$CH_2CH_2CH_2OC(O)(CH_3)$=$CH_2$,
(b) —$CH_2CH_2CH_2NH_2$,
(c) —$CH_2CH_2CH_2NHCH_2CH_2NH_2$,
(d)

—$CH_2CH_2CH_2OCH_2CHCH_2$,
   \\ /
    O (e)

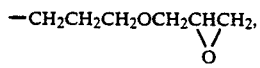

(f) —$CH_2CH_2CH_2SH$,
(g) —$CH_2CH_2CH_2Cl$,
(h)
—$CH_2CH_2CH_2NHCH_2CH_2NHCH_2C_6H_4CH$=$C$-$H_2$.HCl,
(i) —$CH_2CH_2CH_2N^{\oplus}(CH_3)_2C_{18}H_{37}Cl^-$,
(j) —$CH_2CH_2CH_2N^{\oplus}CH_3(C_{12}H_{25})_2Cl^-$,
(k)

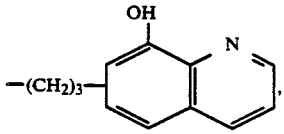

(l) alkyl groups of less than twenty carbon atoms,
(m) aryl groups of less than twelve carbon atoms,
(n) hydrogen,
(o) vinyl, and
(p) allyl.

38. A composition as claimed in claim 37 wherein Q'''
is —(CH₂)₃NH(CH₂)₂NH₂.

39. A composition as claimed in claim 37 wherein Q'''
is —(CH₂)₃NH₂.

40. A composition as claimed in claim 37 wherein Q'''
is $$-(CH_2)_3OCH_2\underset{O}{\underset{\diagdown\diagup}{CH}}CH_2$$

41. A composition as claimed in claim 37 wherein Q'''
is —(CH₂)₃N⊕(CH₃)₂C₁₈H₃₇Cl⁻.

42. A composition as claimed in claim 37 wherein Q'''
is —(CH₂)₈CH₃.

43. A composition as claimed in claim 37 wherein Q'''
is —(CH₂)₁₇CH₃.

44. A composition as claimed in claim 15 wherein the groups reacted to the porous interior surface in step (III) are derived from silanes selected from a group consisting of (i) disubstituted amidosilanes wherein the amidosilanes are selected from a group consisting of
  (a) N,N-disubstituted amidosilanes having the general formula $$(R)(R'')_a Si\{N(R''')C\overset{\displaystyle O}{\overset{\displaystyle \parallel}{R'}}\}_b$$

and
  (b) N,O-disubstituted amidosilanes having the general formula $$(R)(R'')_a Si\left(\begin{array}{c}N=C-R'\\|\\OSi(R)(R'')_2\end{array}\right)_b$$

wherein in said formulae, R is selected from hydrogen, allyl, vinyl and Q wherein Q is selected from a group consisting of
  (a) alkyl groups having less than twenty carbon atoms,
  (b) aryl groups having less than twenty carbon atoms,
  (c) —(CH₂)₂CF₃,
  (d) —(CH₂)₃Cl,
  (e) —(CH₂)₃SR$^{iv}$,
  (f) —(CH₂)₃NR₂$^{iv}$,
  (g) —(CH₂)₃N(R$^{iv}$)(CH₂)₂N(R$^{iv}$)₂,
  (h)

$$-(CH_2)_3OCH_2\underset{O}{\underset{\diagdown\diagup}{CH}}CH_2,$$

(i)

—(CH₂)₂—[cyclic S, C=O ring], (j) —(CH₂)₃OC(O)C(CH₃)=CH₂,
  (k)

—(CH₂)₃—[8-hydroxyquinolinyl with OR$^{iv}$]

and
  (l) —C₂H₄C$_n$F$_{2n+1}$, wherein n is at least 2; R'' is independently selected from methyl, ethyl and phenyl groups; R''' is selected from methyl, ethyl and phenyl groups; R' is a substituted or unsubstituted alkyl group of from 1 to 6 carbon atoms or hydrogen; R$^{iv}$ is selected from methyl, ethyl and phenyl groups; a+b has a value of 3 and neither a nor b has a value of zero;

(ii) substituted aminosilanes wherein the aminosilanes are selected from a group consisting of
  (a) N,N,N-trisubstituted aminosilanes having the general formula (R$^v$)(R$^{vi}$)$_c$Si(NR$^{vii}$₂)$_d$ and
  (b) heterocyclic aminosilanes, wherein the heterocyclic aminosilanes are selected from the group consisting of

[pyrrole-N–SiR₃$^{viii}$], [thiomorpholine S,N–SiR₃$^{viii}$],

[O,S,N-ring NSiR₃$^{viii}$] and [S,N-ring NSiR₃$^{viii}$],

[pyrrole-N ring SiR₂$^{viii}$]₂, [pyrrole-N ring SiR$^{viii}$]₃,

[S,N-ring SiR₂$^{viii}$]₂, [S,N-ring SiR$^{viii}$]₃,

[O,S,N-ring SiR₂$^{viii}$]₂, [O,S,N-ring SiR$^{viii}$]₃,

[S,N-ring SiR₂$^{viii}$]₂, [S,N-ring SiR$^{viii}$]₃;

wherein in said formulae R$^v$ and R$^{viii}$ are selected from a group consisting of hydrogen, allyl, vinyl and Q' wherein Q' is selected from a group consisting of
  (a) alkyl groups having less than twenty carbon atoms,
  (b) aryl groups having less than twenty carbon atoms,
  (c) —(CH₂)₂CF₃,
  (d) —(CH₃)₃SR$^{ix}$,
  (e) —(CH₂)₃NR₂$^{ix}$, (f) —$(CH_2)_3N(R^{ix})(CH_2)_2N(R^{ix})_2$,
(g)

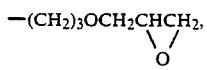

(h)

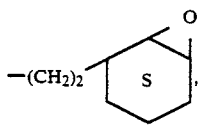

(i) —$(CH_2)_3OC(O)C(CH_3)=CH_2$,
(j)

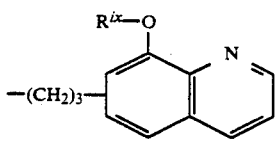

and
(k) —$C_2H_4C_nF_{2n+1}$, wherein n is at least 2; $R^{vi}$ is independently selected from methyl, ethyl and phenyl groups; $R^{vii}$ is independently selected from methyl, ethyl and phenyl groups; $R^{ix}$ is independently selected from alkyl groups of 1 to 6 carbon atoms and phenyl groups; c+d has a value of 3 and neither c nor d has a value of zero; and (iii) thioethersilanes selected from the group consisting of (a) thioethersilanes having the general formula $R^xR_2^{xi}SiSR^{xii}$ and (b) thioethersilanes having the general formula $(R^xR_2^{xi}Si)_2S$ wherein in said formulae, $R^x$ is selected from a group consisting of hydrogen, allyl, vinyl and Q" wherein Q" is selected from a group consisting of (a) alkyl groups having less than twenty carbon atoms, (b) aryl groups having less than twenty carbon atoms, (c) —$(CH_2)_2CF_3$,
(d) —$(CH_3)_3SR^{xiii}$,
(e) —$(CH_2)_3NR_2^{xiii}$,
(f) —$(CH_2)_3NR_2^{xiii}$,
(g)

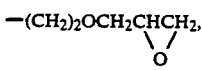

(h)

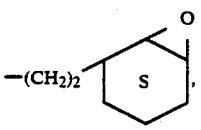

(i) —$(CH_2)_3OC(O)C(CH_3)=CH_2$,
(j)

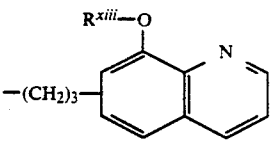

and
(k) —$C_2H_4C_nF_{2n+1}$, wherein n is at least 2; $R^{xi}$ is independently selected from methyl, ethyl and phenyl groups; $R^{xii}$ is independently selected from methyl, ethyl and phenyl groups, $R^{xiii}$ is independently selected from alkyl groups having 1 to 6 carbon atoms and phenyl.

45. A composition as claimed in claim 15 wherein the groups reacted to the porous interior surface in step (III) are derived from silanes selected from disubstituted amidosilanes having the general formula $(R)(R'')_aSi\{N(R''')CR'\}_b$ wherein R is selected from hydrogen, allyl, vinyl, and Q wherein Q is selected from from a group consisting of (a) alkyl groups having less than twenty carbon atoms, (b) aryl groups having less than twenty carbon atoms,
(c) —$(CH_2)_2CF_3$,
(d) —$(CH_2)_3Cl$,
(e) —$(CH_2)_3SR^{iv}$,
(f) —$(CH_2)_3NR_2^{iv}$,
(g) —$(CH_2)_3N(R^{iv})(CH_2)_2N(R^{iv})_2$,
(h)

(i)

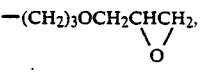

(j) —$(CH_2)_3OC(O)C(CH_3)=CH_2$,
(k)

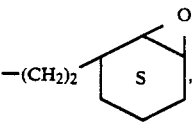

and
(l) —$C_2H_4C_nF_{2n+1}$, wherein n is at least 2; R' is a substituted or unsubstituted alkyl group of from 1 to 6 carbon atoms or hydrogen; R" and R''' are each independently selected from methyl, ethyl and phenyl groups: a+b has a value of 3 and neither a nor b has a value of zero.

46. A composition as claimed in claim 45 wherein the disubstituted amidosilane has the formula

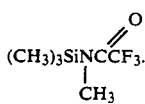

47. A composition as claimed in claim 45 wherein the disubstituted amidosilane has the formula

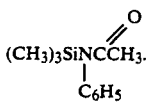

48. A composition as claimed in claim 45 wherein the disubstituted amidosilane has the formula

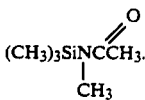

49. A composition as claimed in claim 45 wherein the disubstituted amidosilane has the formula

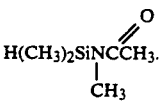

50. A composition as claimed in claim 45 wherein the disubstituted amidosilane has the formula

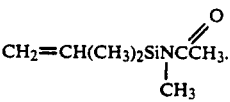

51. A composition as claimed in claim 45 wherein the disubstituted amidosilane has the formula

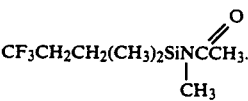

52. A composition as claimed in claim 15 wherein the groups reacted to the porous interior surface in step (III) are derived from amidosilanes consisting of disubstituted amidosilanes having the general formula $(R)(R'')_2SiN=C\{OSi(R)(R'')_2\}R'$ wherein R is selected from hydrogen, allyl, vinyl and Q wherein Q is selected from (a) alkyl groups having less than twenty carbon atoms,
(b) aryl groups having less than twenty carbon atoms,
(c) —$(CH_2)_2CF_3$,
(d) —$(CH_2)_3Cl$,
(e) —$(CH_2)_3SR^{iv}$,
(f) —$(CH_2)_3NR_2^{iv}$,
(g) —$(CH_2)_3N(R^{iv})(CH_2)_2N(R^{iv})_2$,
(h)

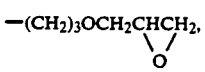

(i)

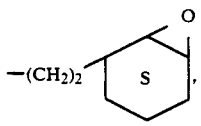

(j) —$(CH_2)_3OC(O)C(CH_3)=CH_2$,
(k)

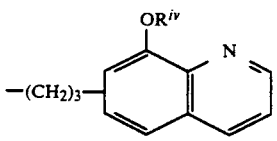

and
(l) —$C_2H_4C_nF_{2n+1}$,
wherein n is at least 2; R' is a substituted or unsubstituted alkyl group of from 1 to 6 carbon atoms or hydrogen and R'' is independently selected from methyl, ethyl and phenyl groups.

53. A composition as claimed in claim 52 wherein the disubstituted amidosilane has the formula

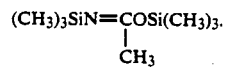

54. A composition as claimed in claim 52 wherein the disubstituted amidosilane has the formula

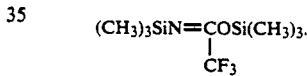

55. A composition as claimed in claim 15 wherein the groups reacted to the porous interior surface in step (III) are derived from aminosilanes which are trisubstituted aminosilanes having the general formula $(R^v)(R^{vi})_cSi(NR^{vii}_2)_d$ wherein $R^v$ is selected from a group consisting of hydrogen, allyl, vinyl and Q' wherein Q' is selected from a group consisting of (a) alkyl groups having less than twenty carbon atoms,
(b) aryl groups having less than twenty carbon atoms,
(c) —$(CH_2)_2CF_3$,
(d) —$(CH_3)_3SR^{ix}$,
(e) —$(CH_2)_3NR_2^{ix}$,
(f) —$(CH_2)_3N(R^{ix})(CH_2)_2N(R^{ix})_2$,
(g)

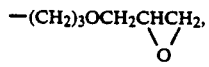

(h)

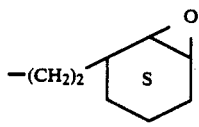

(i) —$(CH_2)_3OC(O)C(CH_3)=CH_2$;
(j)

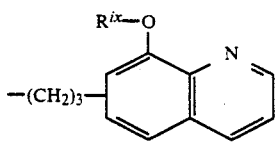

and (k) —C₂H₄C$_n$F$_{2n+1}$, wherein n is at least 2: R$^{vi}$ and R$^{vii}$ are each independently selected from methyl, ethyl and phenyl groups; R$^{viii}$ is independently selected from alkyl groups of 1 to 6 carbon atoms; R$^{ix}$ is independently selected from hydrogen, methyl, ethyl and phenyl groups; c+d has a value of 3 and neither c nor d has a value of zero.

56. A composition as claimed in claim 55 wherein the trisubstituted aminosilane has the formula (CH₃)₃SiN(C₂H₅)₂.

57. A composition as claimed in claim 55 wherein the trisubstituted aminosilane has the formula (CH₃)₃SiN(CH₃)₂.

58. A composition as claimed in claim 15 wherein the groups reacted to the porous interior surface in step (III) are derived from aminosilanes which are heterocyclic aminosilanes which are selected from a group consisting of

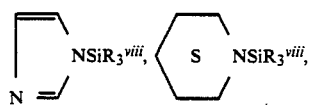

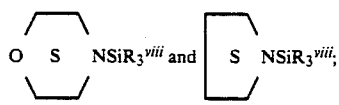

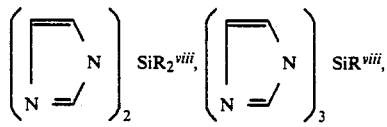

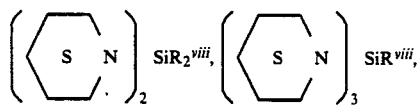

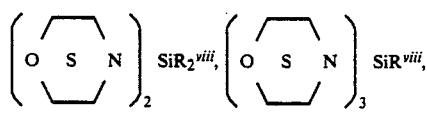

wherein R$^{viii}$ is independently selected from a group consisting of hydrogen, allyl, vinyl and Q' wherein Q' is selected from a group consisting of
  (a) alkyl groups having less than twenty carbon atoms,
  (b) aryl groups having less than twenty carbon atoms,
  (c) —(CH₂)₂CF₃,
  (d) —(CH₃)₃SR$^{ix}$,
  (e) —(CH₂)₃NR₂$^{ix}$,
  (f) —(CH₂)₃N(R$^{ix}$)(CH₂)₂N(R$^{ix}$)₂,
  (g)

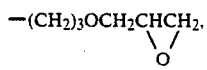

(h)

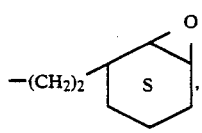

(i) —(CH₂)₃OC(O)C(CH₃)=CH₂,
  (j)

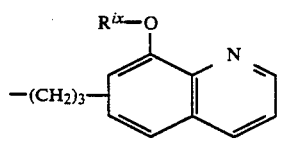

and (k) —C₂H₄C$_n$F$_{2n+1}$, wherein n is at least 2 R$^{ix}$ is independently selected from alkyl groups of 1 to 6 carbon atoms and phenyl groups.

59. A composition as claimed in claim 58 wherein the heterocyclic aminosilane has the formula

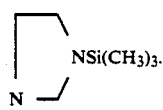

60. A composition as claimed in claim 58 wherein the heterocyclic aminosilane has the formula

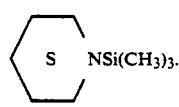

61. A composition as claimed in claim 58 wherein the heterocyclic aminosilane has the formula

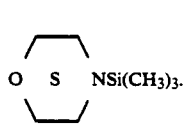

62. A composition as claimed in claim 58 wherein the heterocyclic aminosilane has the formula

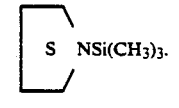

63. A composition as claimed in claim 15 wherein the groups reacted to the porous interior surface in step (III) are derived from thioethersilanes having the general formula (R$^x$)(R$^{XI}$)₂SiS(R$^{xii}$) wherein R$^x$ is selected from a group consisting of hydrogen, allyl, vinyl and Q" wherein Q" is selected from a group consisting of
(a) alkyl groups having less than twenty carbon atoms,
(b) aryl groups having less than twenty carbon atoms,
(c) —(CH$_2$)$_2$CF$_3$,
(d) —(CH$_3$)$_3$SR$^{xiii}$,
(e) —(CH$_2$)$_3$NR$_2^{xiii}$,
(f) —(CH$_2$)$_3$NR$_2^{xiii}$,
(g)

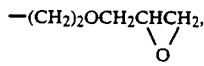
—(CH$_2$)$_2$OCH$_2$CHCH$_2$, (h)

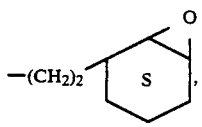

(i) —(CH$_2$)$_3$OC(O)C(CH$_3$)=CH$_2$,
(j)

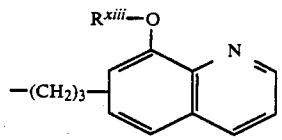

and
(k) —C$_2$H$_4$C$_n$F$_{2n+1}$,
wherein n is at least 2; R$^{xi}$ and R$^{xii}$ are each independently selected from methyl, ethyl, and phenyl groups; R$^{xiii}$ is independently selected from alkyl groups having 1 to 6 carbon atoms and phenyl groups.

64. A composition as claimed in claim 63 wherein the thioethersilane has the formula (CH$_3$)$_3$SiSCH$_3$.

65. A composition as claimed in claim 63 wherein the thioethersilane has the formula (CH$_3$)$_3$SiS(CH$_2$)$_5$CH$_3$.

66. A composition as claimed in claim 15 wherein the groups reacted to the porous interior surface in step (III) are derived from common silanes having the general formula R$^{xv}_{4-e}$SiX$_e$ wherein R$^{xv}$ is independently selected from hydrogen, alkyl groups having 1 to 4 carbon atoms, phenyl, vinyl and allyl; X is a hydrolyzable radical selected from chlorine, alkoxy having 1 to 4 carbon atoms, acetoxy, amine and amido radicals and e has a value of 1, 2 or 3.

67. A composition as claimed in claim 15 wherein the porous material is a silica gel.

68. A composition as claimed in claim 15 wherein the porous material is alumina.

69. A composition as claimed in claim 15 wherein the porous material is titania.

70. A composition as claimed in claim 15 wherein the porous material is zirconia.

71. A method of silylating a porous material having an external zone which comprises the external surfaces of the porous material and having an internal zone which comprises the internal surfaces of the porous material, comprising:
(A) contacting a hydroxyl-bearing porous material with less than or equal to two-thirds of the amount representing saturation coverage of a residue from silanes having rapidly reacting leaving groups, said silane selected from a group consisting of
(i) disubstituted amidosilanes wherein the amidosilanes are selected from a group consisting of;
(a) N,N-disubstituted amidosilanes having the general formula

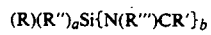
(R)(R")$_a$Si{N(R''')CR'}$_b$ and
(b) N,O-disubstituted amidosilanes having the general formula

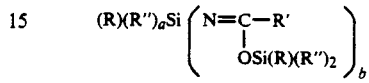

wherein in said formulae, R is selected from hydrogen, allyl, vinyl and Q wherein Q is selected from a group consisting of
(a) alkyl groups having less than twenty carbon atoms,
(b) aryl groups having less than twenty carbon atoms,
(c) —(CH$_2$)$_2$CF$_3$,
(d) —(CH$_2$)$_3$Cl,
(e) —(CH$_2$)$_3$SR$^{iv}$,
(f) —(CH$_2$)$_3$NR$_2^{iv}$,
(g) —(CH$_2$)$_3$N(R$^{iv}$)(CH$_2$)$_2$N(R$^{iv}$)$_2$,
(h)

—(CH$_2$)$_3$OCH$_2$CHCH$_2$, (i)

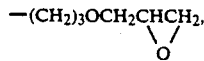

(j) —(CH$_2$)$_3$OC(O)C(CH$_3$)=CH$_2$,
(k)

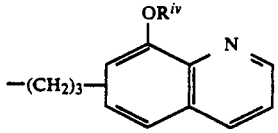

and
(l) —C$_2$H$_4$C$_n$F$_{2n+1}$,
wherein n is at least 2; R" is independently selected from methyl, ethyl and phenyl groups; R''' is selected from methyl, ethyl and phenyl groups; R' is a substituted or unsubstituted alkyl group of from 1 to 6 carbon atoms or hydrogen; R$^{iv}$ is selected from methyl, ethyl and phenyl groups; a+b has a value of 3 and b does not have a value of zero; (ii) substituted aminosilanes wherein the aminosilanes are selected from a group consisting of
(a) N,N,N-trisubstituted aminosilanes having the general formula (R$^v$)(R$^{vi}$)$_c$Si(NR$^{vii}_2$)$_d$ and (b) heterocyclic aminosilanes, wherein the heterocyclic aminosilanes are selected from the group consisting of

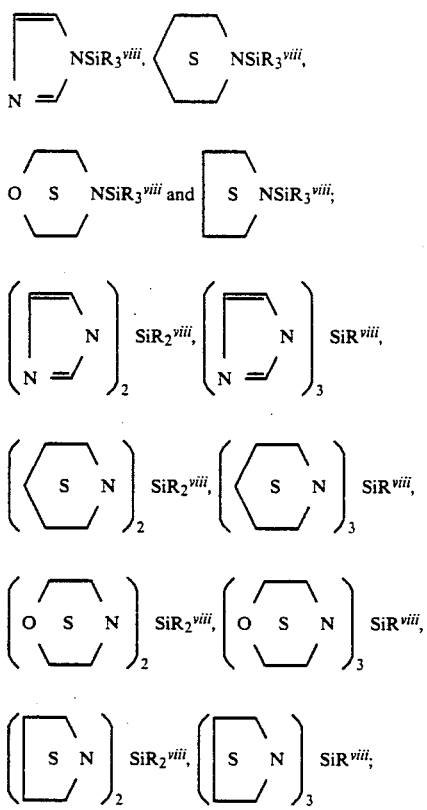

(iii) thioethersilanes selected from the group consisting of (a) thioethers having the general formula $R^xR_c^{xi}Si(SR^{xii})_d$ and (b) thioethers having the general formula $(R^xR_2^{xi}Si)_2S$ wherein in said formulae, $R^x$ is selected from a group consisting of hydrogen, allyl, vinyl and Q'' wherein Q'' is selected from a group consisting of (a) alkyl groups having less than twenty carbon atoms, (b) aryl groups having less than twenty carbon atoms, (c) —$(CH_2)_2CF_3$, (d) —$(CH_3)_3SR^{xiii}$, (e) —$(CH2)3NR_2^{xiii}$, (f) —$(CH_2)_3N(R^{xiii})(CH_2)_2N(R^{xiii})_2$, (g)

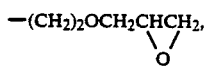

(h)

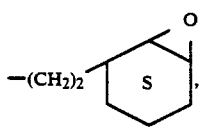

(i) —$(CH_2)_3OC(O)C(CH_3)=CH_2$, (j)

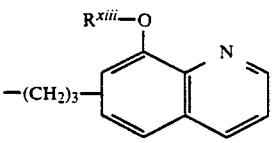

and (k) —$C_2H_4C_nF_{2n+1}$, wherein n is at least 2; $R^{xi}$ is independently selected from methyl, ethyl and phenyl groups; $R^{xii}$ is independently selected from methyl, ethyl and phenyl groups; $R^{xiii}$ is independently selected from alkyl groups having 1 to 6 carbon atoms and phenyl; c+d has a value of 3 and d does not have a value of zero;

(B) allowing the mixture from (A) to react and form covalent bonds by reaction with the exterior surface hydroxyl groups thereby treating the porous material exterior surface, (C) subsequently isolating the silylated porous material from the mixture of (B).

72. A method as claimed in claim 71, wherein in step (A), the rapidly reacting silane is gradually added to a rapidly mixed liquid suspension of the porous material.

73. A method as claimed in claim 71, wherein in step (A), the rapidly reacting silane is gradually added to a rapidly stirred solvent which is in direct contact with non-particulate porous material.

74. A method as claimed in claim 71, wherein in step (A), the rapidly reacting silane as a vapor in a vacuum is intimately contacted with the porous material.

75. A method as claimed in claim 71, wherein in step (A), a carrier gas is used to bring the vapor of a rapidly reacting silane into contact with the porous material.

76. A method as claimed in claim 71, wherein step (A) and step (B) are carried out a temperature in the range of 0° C. to 400° C.

77. A method as claimed in claim 71, wherein step (A) and step (B) are carried out at a temperature in the range of 20° C. to 200° C.

78. A composition of matter consisting of silylated porous material having an external zone which comprises the external surfaces of the porous material and having an internal zone which comprises the internal surfaces of the porous material which has been prepared by a method comprising (I) contacting a hydroxyl-bearing porous material with less than or equal to two-thirds of any amount representing saturation coverage of a residue from a silane having rapidly reacting leaving groups, based on the hydroxyl content of the porous material, said silane selected from (i) disubstituted amidosilanes wherein the amidosilanes are selected from a group consisting of;

(a) N,N-disubstituted amidosilanes having the general formula

and (b) N,O-disubstituted amidosilanes having the general formula

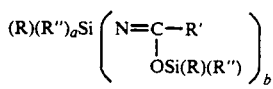

wherein in said formulae, R is selected from hydrogen, allyl, vinyl and Q wherein Q is selected from a group consisting of
(a) alkyl groups having less than twenty carbon atoms,
(b) aryl groups having less than twenty carbon atoms,
(c) —$(CH_2)_2CF_3$,
(d) —$(CH_2)_3Cl$,
(e) —$(CH_2)_3SR^{iv}$,
(f) —$(CH_2)_3NR_2^{iv}$,
(g) —$(CH_2)_3N(R^{iv})(CH_2)_2N(R^{iv})_2$,
(h)

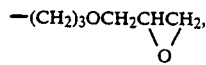

(i)

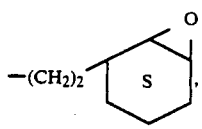

(j) —$(CH_2)_3OC(O)C(CH_3)=CH_2$,
(k)

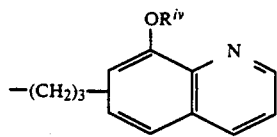

and
(l) —$C_2H_4C_nF_{2n+1}$,
wherein n is at least 2; R'' is independently selected from methyl, ethyl and phenyl groups; R''' is selected from methyl, ethyl and phenyl groups; R' is a substituted or unsubstituted alkyl group of from 1 to 6 carbon atoms or hydrogen; $R^{iv}$ is selected from methyl, ethyl and phenyl groups; a+b has a value of 3 and b does not have a value of zero;

(ii) substituted aminosilanes wherein the aminosilanes are selected from a group consisting of
(a) N,N,N-trisubstituted aminosilanes having the general formula $(R^v)(R^{vi})_cSi(NR^{vii}_2)_d$ and
(b) heterocyclic aminosilanes, wherein the heterocyclic aminosilanes are selected from the group consisting of

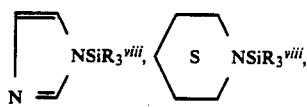

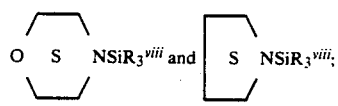

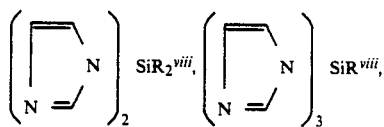

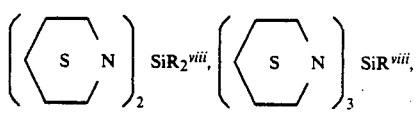

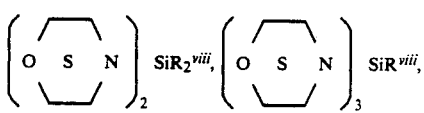

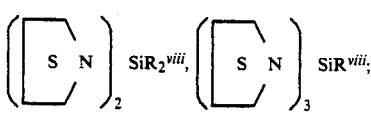

(iii) thioethersilanes selected from the group consisting of (a) thioethersilanes having the general formula $R^xR_c^{xi}Si(SR^{xii})_d$ and (b) thioethersilanes having the general formula $(R^xR_2^{xi}Si)_2S$ wherein in said formulae, $R^x$ is selected from a group consisting of hydrogen, allyl, vinyl and Q'' wherein Q'' is selected from a group consisting of
(a) alkyl groups having less than twenty carbon atoms,
(b) aryl groups having less than twenty carbon atoms,
(c) —$(CH_2)_2CF_3$,
(d) —$(CH_3)_3SR^{xiii}$,
(e) —$(CH_2)_3NR_2^{xiii}$,
(f) —$(CH_2)_3N(R^{xiii})(CH_2)_2N(R^{xiii})_2$,,
(g)

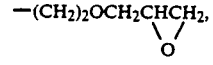

(h)

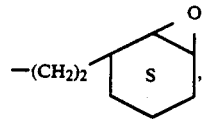

(i) —$(CH_2)_3OC(O)C(CH_3)=CH_2$,
(j)

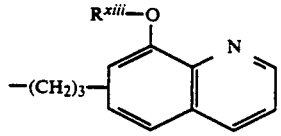

and (k) —$C_2H_4C_nF_{2n+1}$, wherein n is at least 2; $R^{xi}$ is independently selected from methyl, ethyl and phenyl groups; $R^{xii}$ is independently selected from methyl, ethyl and phenyl groups, $R^{xiii}$ is independently selected from alkyl groups having 1 to 6 carbon atoms and phenyl, c+d has a value of 3 and d does not have a value of zero;

(II) allowing the mixture from (I) to react and form covalent bonds by reaction with the surface hydroxyl groups thereby predominantly treating the porous exterior surface.

(III) subsequently isolating the silylated porous material from the mixture of (II). wherein silylated porous material exists when certain conditions exist, said conditions being selected from the group consisting of $$\frac{\Gamma_1(E)}{\Gamma_1(A)} \geq 1.5 \text{ and } \Gamma_1(E) \geq 0.3 \text{ molecules}/nM^2 \text{ and} \quad (a)$$

$$\frac{\Gamma_1(E)}{\Gamma_1(A)} \geq 1.5 \text{ and } \Gamma_1(E) \geq 15\% \text{ of saturation of the surface of the porous material.} \quad (b)$$

wherein $\Gamma_1$ (E) is the external surface density in Molecules/$nM^2$ of the reaction product of step (II) as inferred by a method which selectively analyzes the external surface such as Electron Spectroscopy for Chemical Analysis, and wherein $\Gamma_1$ (A) is a like measurement of average surface density as measured by bulk analysis.

79. A composition as claimed in claim 78 wherein the groups formed by steps (I) and (II) are derived from rapidly reacting silanes selected from a group consisting of (i) disubstituted amidosilanes wherein the amidosilanes are selected from a group consisting of
(a) N,N-disubstituted amidosilanes having the general formula

and
(b) N,O-disubstituted amidosilanes having the general formula

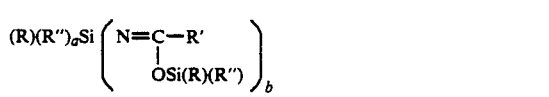

wherein in said formulae, R is selected from hydrogen, allyl, vinyl and Q wherein Q is selected from a group consisting of
(a) alkyl groups having less than twenty carbon atoms,
(b) aryl groups having less than twenty carbon atoms,
(c) —$(CH_2)_2CF_3$,
(d) —$(CH_2)_3Cl$,
(e) —$(CH_2)_3SR^{iv}$,
(f) —$(CH_2)_3NR_2^{iv}$,
(g) —$(CH_2)_3N(R^{iv})(CH_2)_2N(R^{iv})_2$,
(h)

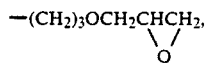

(i)

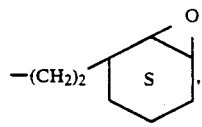

(j) —$(CH_2)_3OC(O)C(CH_3)=CH_2$,
(k)

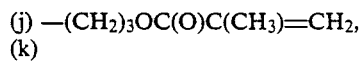

and
(l) —$C_2H_4C_nF_{2n+1}$,
wherein n is at least 2; R" is independently selected from methyl, ethyl and phenyl groups; R''' is selected from methyl, ethyl and phenyl groups; R' is a substituted or unsubstituted alkyl group of from 1 to 6 carbon atoms or hydrogen; $R^{iv}$ is selected from alkyl groups of 1 to 6 carbon atoms and phenyl groups; a+b has a value of 3 and neither a nor b has a value of zero;
(ii) substituted aminosilanes wherein the aminosilanes are selected from a group consisting of
(a) N,N,N-trisubstituted amines having the general formula $(R^v)(R^{vi})_cSi(NR^{vii}_2)_d$ and
(b) heterocyclic aminosilanes, wherein the heterocyclic aminosilanes are selected from the group consisting of

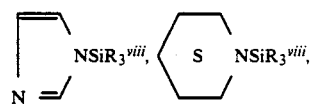

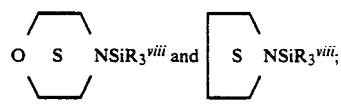

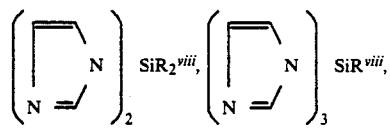

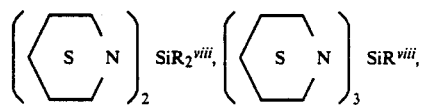

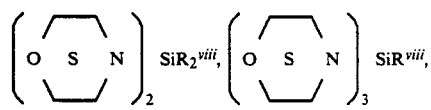

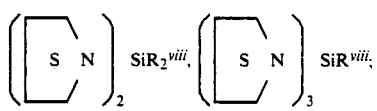

wherein in said formulae $R^v$ and $R^{viii}$ are selected from a group consisting of hydrogen, allyl, vinyl and Q' wherein Q' is selected from a group consisting of
(a) alkyl groups having less than twenty carbon atoms,
(b) aryl groups having less than twenty carbon atoms,
(c) —(CH$_2$)$_2$CF$_3$,
(d) —(CH$_3$)$_3$SR$^{ix}$,
(e) —(CH$_2$)$_3$NR$_2^{ix}$,
(f) —(CH$_2$)$_3$N(R$^{ix}$)(CH$_2$)$_2$N(R$^{ix}$)$_2$,
(g)

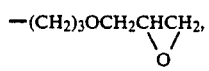

(h)

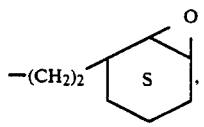

(i) —(CH$_2$)$_3$OC(O)C(CH$_3$)=CH$_2$,
(j)

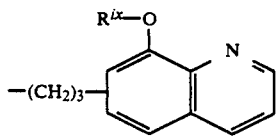

and
(k) —C$_2$H$_4$C$_n$F$_{2n+1}$,
wherein n is at least 2; R$^{vi}$ is independently selected from methyl, ethyl and phenyl groups; R$^{vii}$ is independently selected from methyl, ethyl and phenyl groups; R$^{ix}$ is independently selected from alkyl groups of 1 to 6 carbon atoms and phenyl groups; c+d has a value of 3 and neither c nor d has a value of zero; and
(iii) thioethersilanes selected from the group consisting of (a) thioethersilanes having the general formula R$^x$R$_2^{xi}$SiSR$^{xii}$ and (b) thioethersilanes having the general formula (R$^x$R$_2^{xi}$Si)$_2$S wherein in said formulae, R$^x$ is selected from a group consisting of hydrogen, allyl, vinyl and Q" wherein Q" is selected from a group consisting of
(a) alkyl groups having less than twenty carbon atoms,
(b) aryl groups having less than twenty carbon atoms,
(c) —(CH$_2$)$_2$CF$_3$,
(d) —(CH$_2$)$_3$SR$^{ix}$,
(e) —(CH$_2$)$_3$NR$_2^{ix}$,
(f) —(CH$_2$)$_3$N(R$^{ix}$)(CH$_2$)$_2$N(R$^{ix}$)$_2$,
(g)

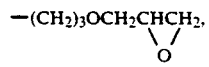

(h)

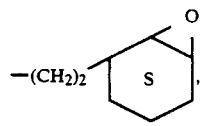

(i) —(CH$_2$)$_3$OC(O)C(CH$_3$)=CH$_2$,
(j)

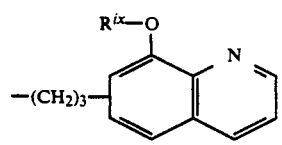

and
(k) —C$_2$H$_4$C$_n$F$_{2n+1}$,
wherein n is at least 2; R$^{xi}$ is independently selected from methyl, ethyl and phenyl groups; R$^{xii}$ is independently selected from methyl, ethyl and phenyl groups, R$^{xiii}$ is independently selected from alkyl groups having 1 to 6 carbon atoms and phenyl.

80. A method of silylating a porous material having an external zone which comprises the external surfaces of the porous material and having an internal zone which comprises the internal surfaces of the porous material, comprising:
(I) contacting a hydroxyl-bearing porous material with less than or equal to two-thirds of the amount representing saturating coverage of a residue from silanes having rapidly reacting leaving groups, said silane selected from a group consisting of
(i) disubstituted amidosilanes wherein the amidosilanes are selected from a group cosisting of;
(a) N,N-disubstituted amidosilanes having the general formula

and
(b) N,O-disubstituted amidosilanes having the general formula

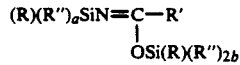

wherein in said formulae, R is selected from hydrogen, allyl, vinyl and Q wherein Q is selected from a group consisting of
(a) alkyl groups having less than twenty carbon atoms,
(b) aryl groups having less than twenty carbon atoms,
(c) —(CH$_2$)$_2$CF$_3$,
(d) —(CH$_2$)$_3$Cl,
(e) —(CH$_2$)$_3$SR$^{iv}$,
(f) —(CH$_2$)$_3$NR$_2^{iv}$, (g) —$(CH_2)_3N(R^{iv})(CH_2)_2N(R^{iv})_2$,
(h)

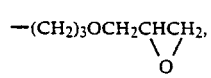

(i)

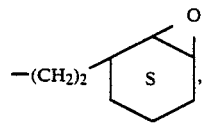

(j) —$(CH_2)_3OC(O)C(CH_3)=CH_2$,
(k)

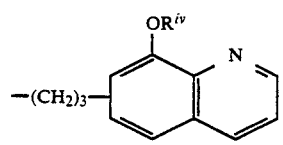

and
(l) —$C_2H_4C_nF_{2n+1}$;
wherein n is at least 2 and R″ is independently selected from methyl, ethyl and phenyl groups; R‴ is selected from methyl, ethyl and phenyl groups; R′ is a substituted or unsubstituted alkyl group of from 1 to 6 carbon atoms or hydrogen; $R^{iv}$ is selected from methyl, ethyl and phenyl groups; a+b has a value of 3 and b does not have a value of zero:

(ii) substituted aminosilanes wherein the aminosilanes are selected from a group consisting of
(a) N,N,N-trisubstituted aminosilanes having the general formula $(R^v)(R^{vi})_cSi(NR^{vii}_2)_d$ and
(b) heterocyclic aminosilanes, wherein the heterocyclic aminosilanes are selected from the group consisting of

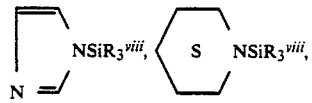

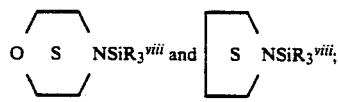

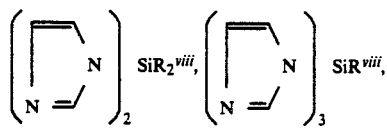

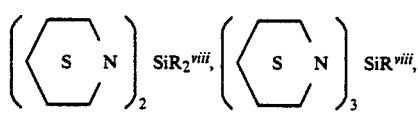

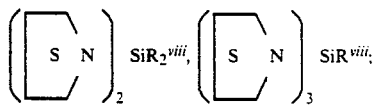

(iii) thioethersilanes selected from the group consisting of thioethersilanes having the general formula (a) $R^xR_c^{xi}Si(SR^{xii})_d$ and (b) $(R^xR_2^{xi}Si)_2S$ wherein in said formulae, $R^x$ is selected from a group consisting of hydrogen, allyl, vinyl and Q″ wherein Q″ is selected from a group consisting of
(a) alkyl groups having less than twenty carbon atoms,
(b) aryl groups having less than twenty carbon atoms,
(c) —$(CH_2)_2CF_3$,
(d) —$(CH_3)_3SR^{xiii}$,
(e) —$(CH_2)_3NR_2^{xiii}$,
(f) —$(CH_2)_3NR_2^{xiii}$,
(g)

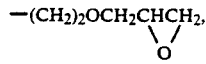

(h)

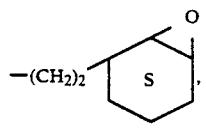

(i) —$(CH_2)_3OC(O)C(CH_3)=CH_2$,
(j)

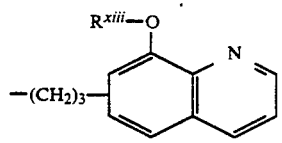

and
(k) —$C_2H_4C_nF_{2n+1}$,
$R^{xi}$ is independently selected from methyl, ethyl and phenyl groups; $R^{xii}$ is independently selected from methyl, ethyl and phenyl groups, $R^{xiii}$ is independently selected from alkyl groups having 1 to 6 carbon atoms and phenyl; c+d has a value of 3 and d does not have a value of zero;

(II) allowing the mixture from (I) to react and form covalent bonds by reaction with the exterior surface hydroxyl groups thereby treating the porous material exterior surface;

(III) thereafter, contacting and mixing the treated porous material from (II) with a second reactive silane, different than the silane of steps (I) and (II), for a period of time to allow the reactive silane. or its silanol-bearing hydrolysis product, to diffuse into the interior of the porous material and covalently bond by reaction with hydroxyl groups on the interior surface of the porous material; and (IV) subsequently isolating the silylated porous material from the mixture of (III).

81. A method as claimed in claim 80, wherein in step (I), the rapidly reacting silane is gradually added to a liquid suspension of the porous material.

82. A method as claimed in claim 80, wherein in step (I), the rapidly reacting silane is gradually added to a rapidly stirred solvent which is in direct contact with non-particulate porous material.

83. A method as claimed in claim 80, wherein in step (I), the rapidly reacting silane as a vapor in a vacuum is intimately contacted with the porous material.

84. A method as claimed in claim 80,, wherein in step (I), a carrier gas is used to bring a vapor of the rapidly reacting silane into contact with the porous material.

85. A method as claimed in claim 80, wherein in step (III), the product from step (II) is contacted with a reactive silane in solution.

86. A method as claimed in claim 80, wherein in step (III), the product from step (II) is contacted with a vapor of a reactive silane.

87. A method as claimed in claim 80, wherein step (I) and step (II) are carried out at a temperature in the range of 0° C. to 400° C.

88. A method as claimed in claim 80, wherein step (I) and step (II) are carried out at a temperature in the range of 20° C. to 200° C.

89. A method as claimed in claim 80, wherein step (III) is carried out at a temperature in the range of 0° C. to 300° C.

90. A method as claimed in claim 80, wherein step (III) is carried out at a temperature in the range of 70° C. to 120° C.

* * * * *